Feb. 4, 1964　　A. F. PICKARD　　3,120,282
WIRE LINE CORE BARREL IMPROVEMENTS
Filed Sept. 18, 1958　　11 Sheets-Sheet 1

INVENTOR
ALBERT F. PICKARD
BY
Ralph L. Dugger
ATTORNEY

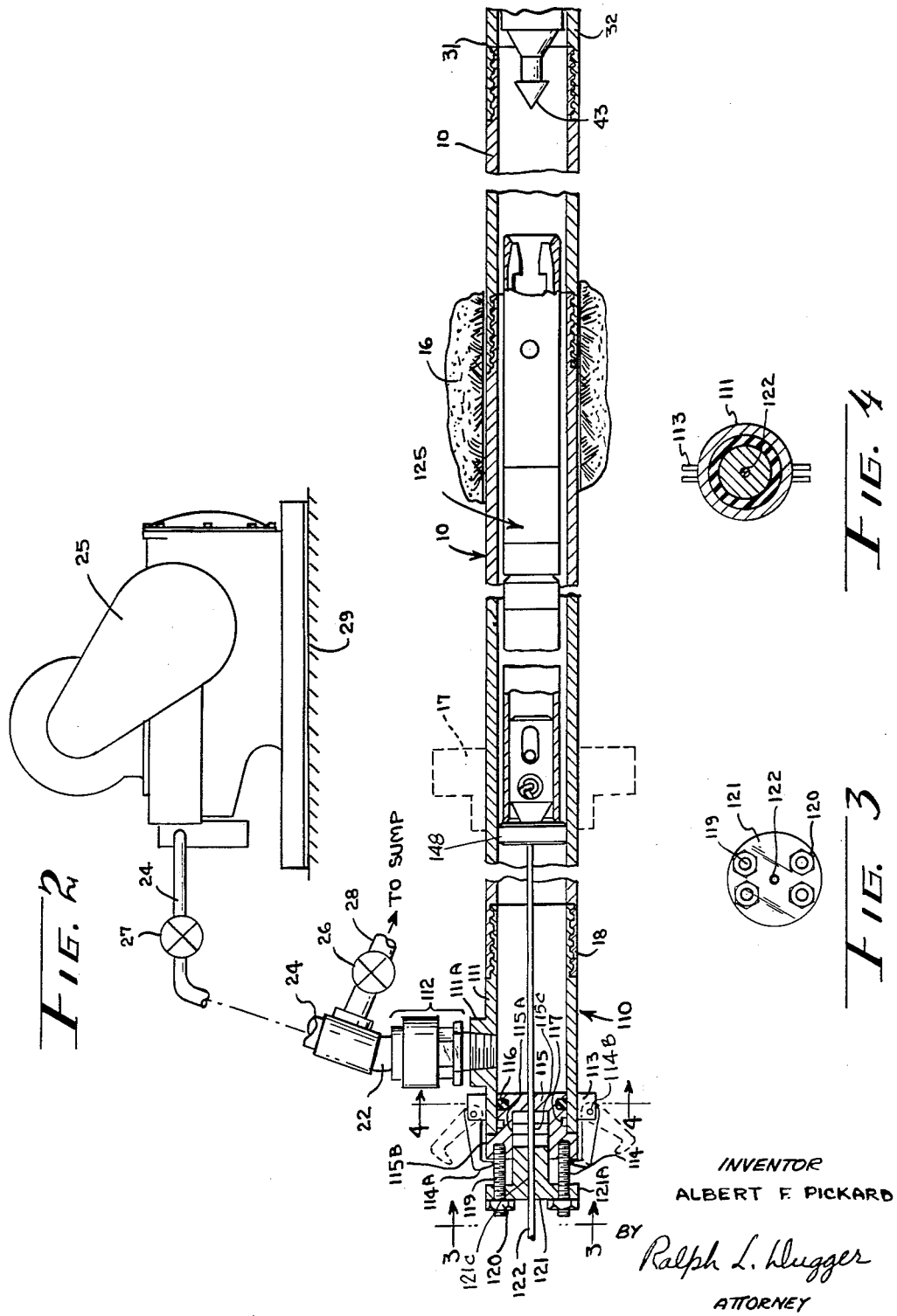

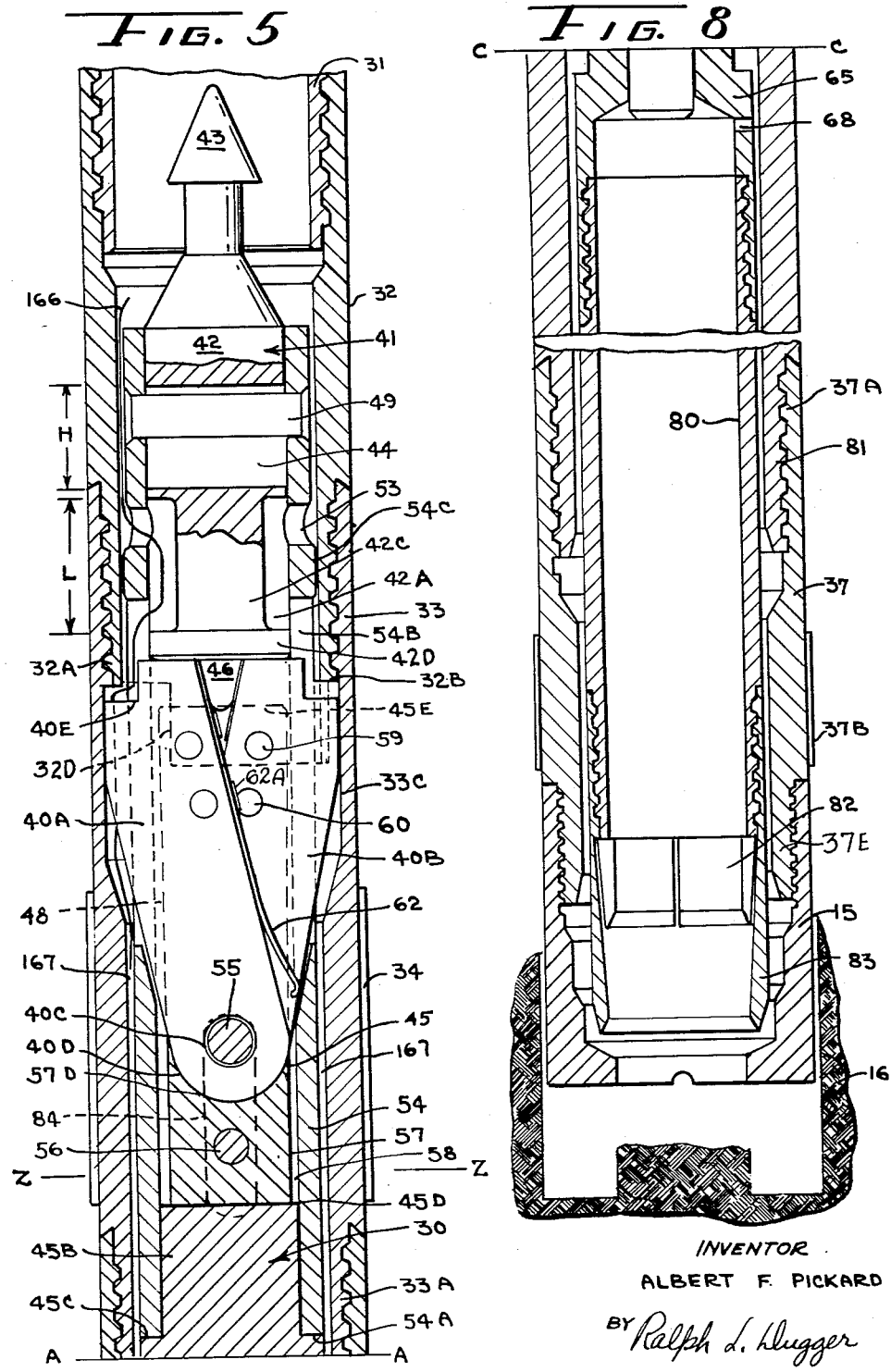

Feb. 4, 1964  A. F. PICKARD  3,120,282
WIRE LINE CORE BARREL IMPROVEMENTS
Filed Sept. 18, 1958  11 Sheets-Sheet 4
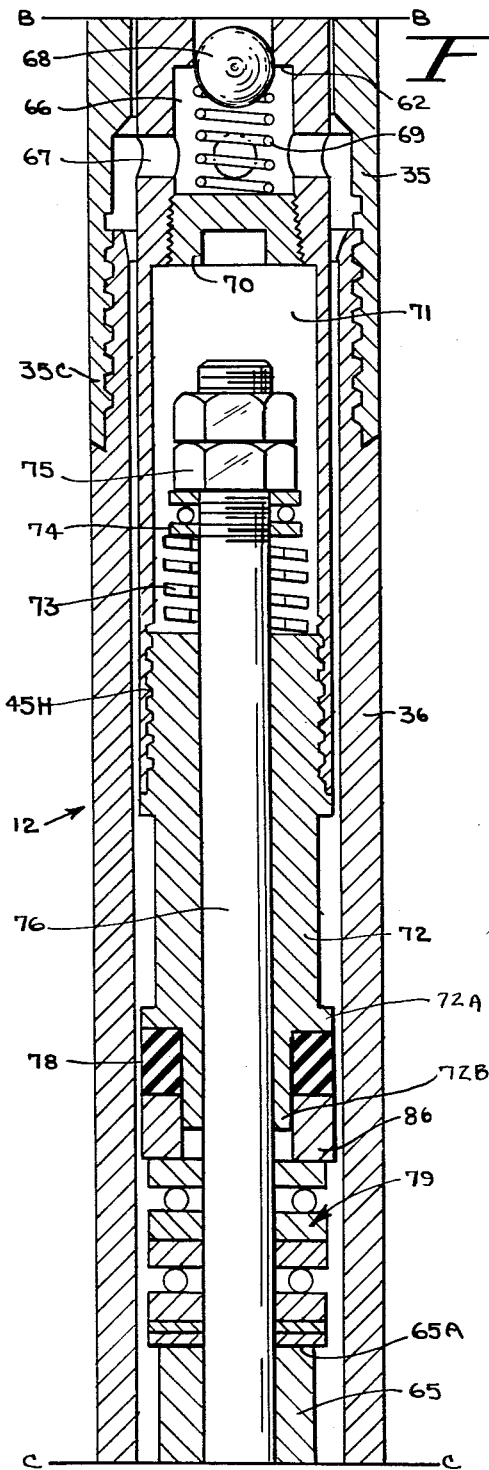
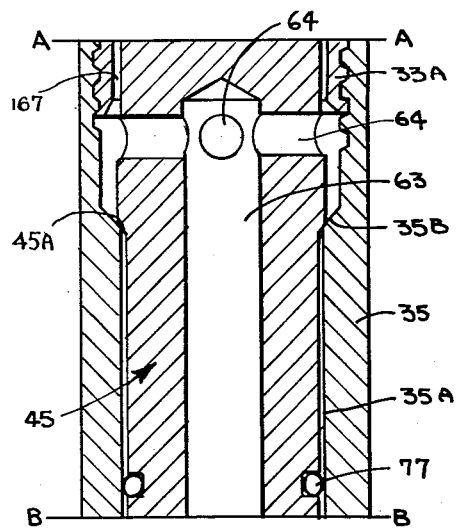
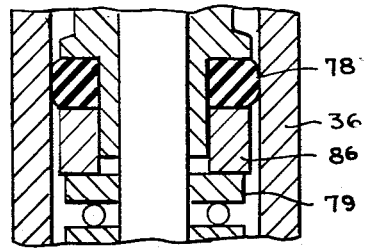
INVENTOR
ALBERT F. PICKARD
BY Ralph L. Dugger
ATTORNEY Feb. 4, 1964　　A. F. PICKARD　　3,120,282
WIRE LINE CORE BARREL IMPROVEMENTS
Filed Sept. 18, 1958　　11 Sheets-Sheet 5
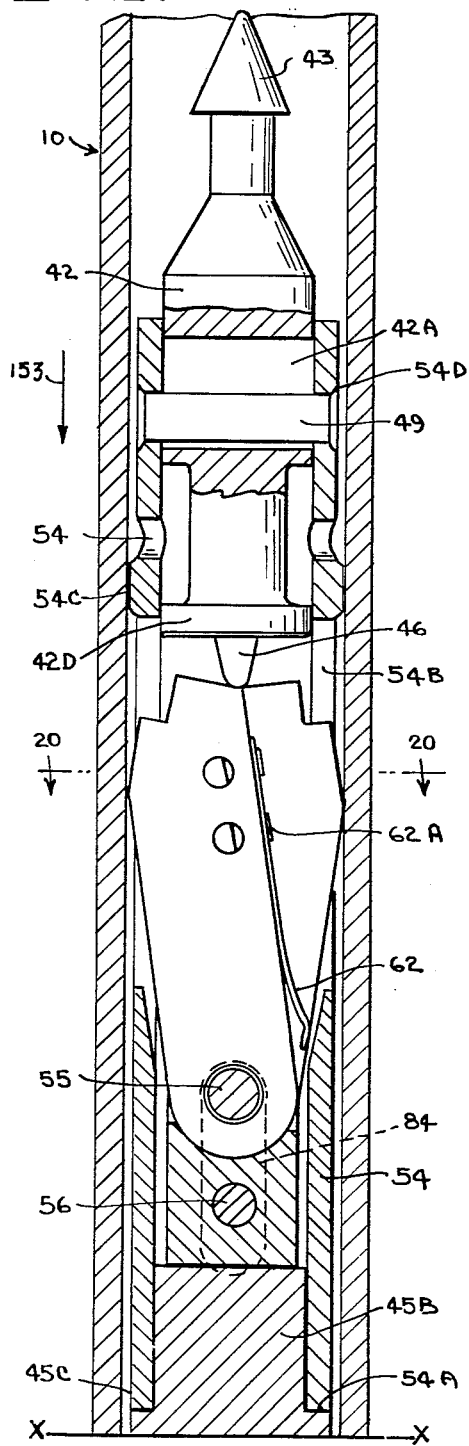
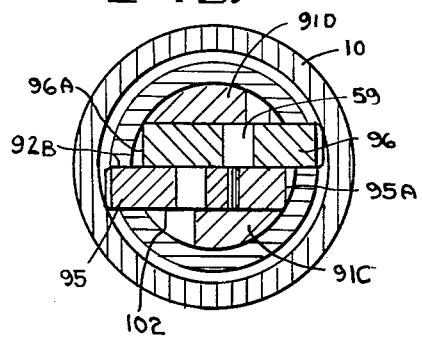
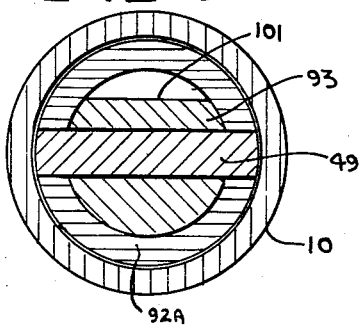
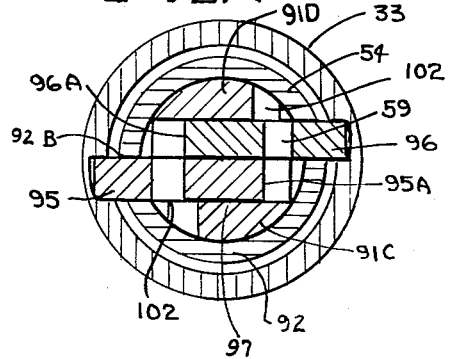
INVENTOR
ALBERT F. PICKARD
BY Ralph L. Dugger
ATTORNEY

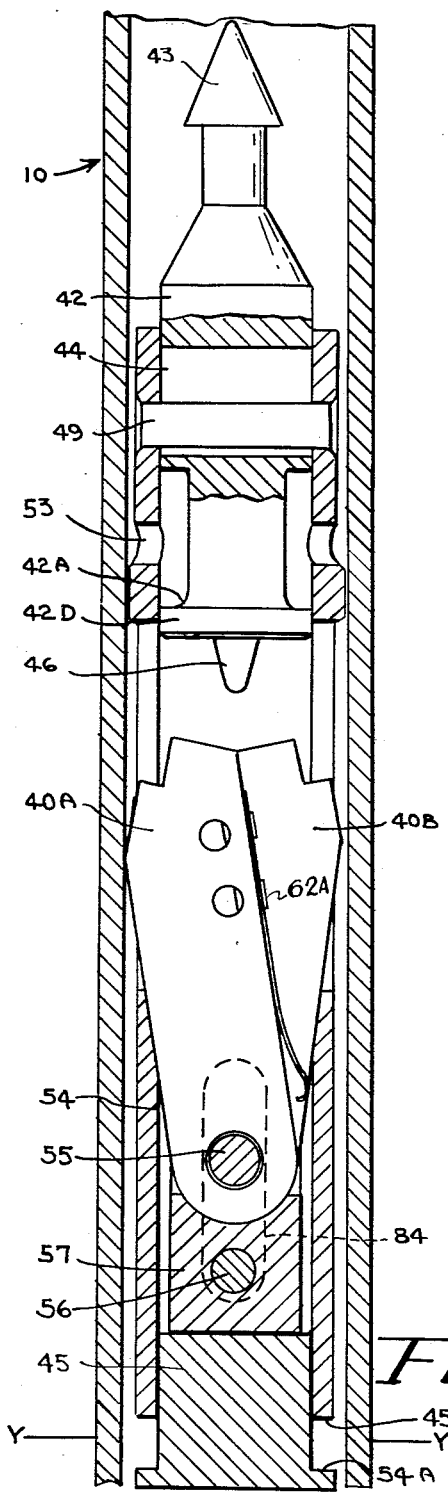
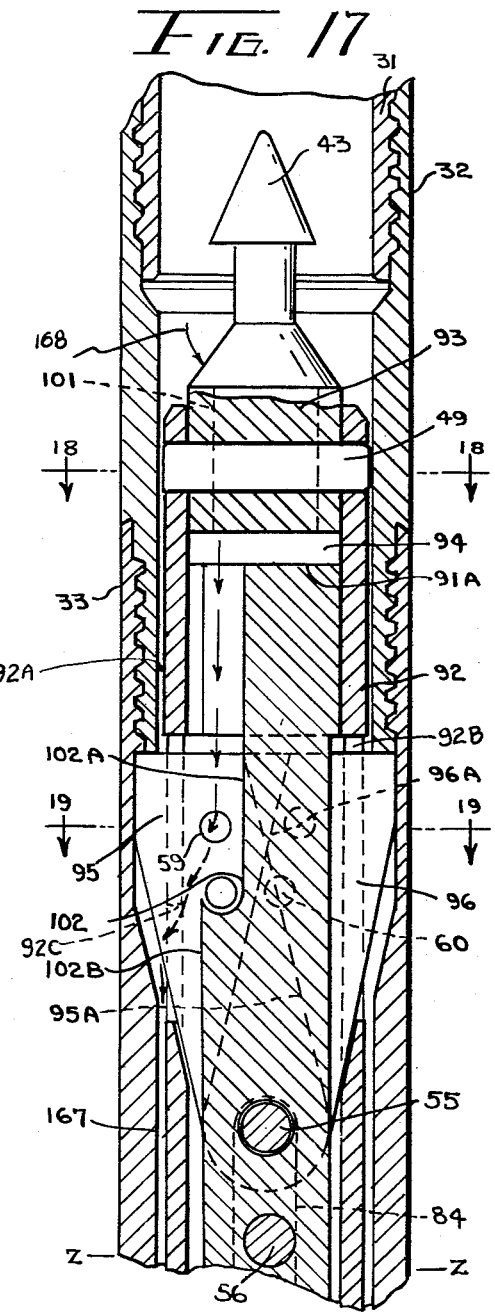

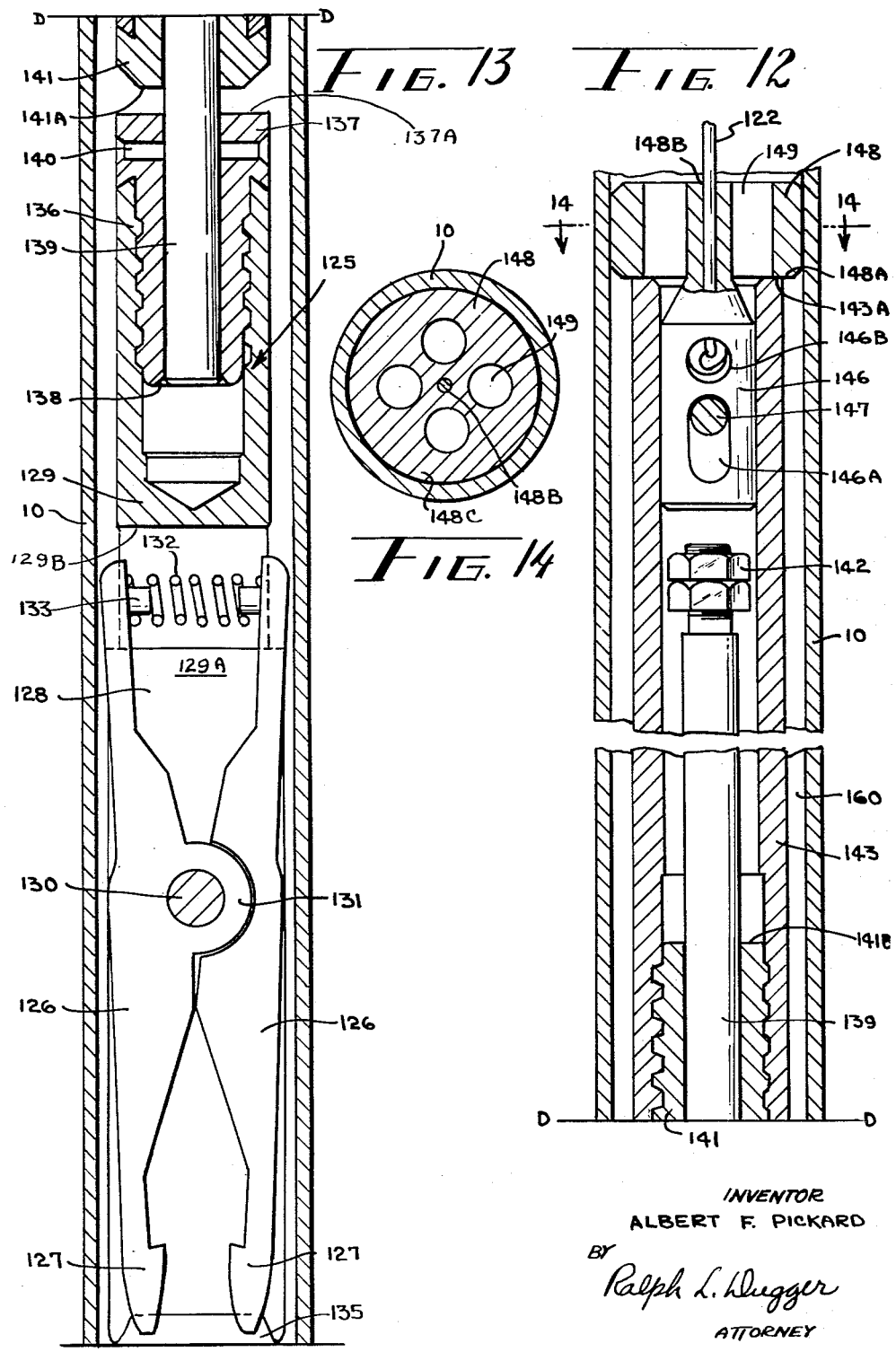

Feb. 4, 1964 A. F. PICKARD 3,120,282
WIRE LINE CORE BARREL IMPROVEMENTS
Filed Sept. 18, 1958 11 Sheets-Sheet 8

INVENTOR
ALBERT F. PICKARD
BY Ralph L. Dugger
ATTORNEY

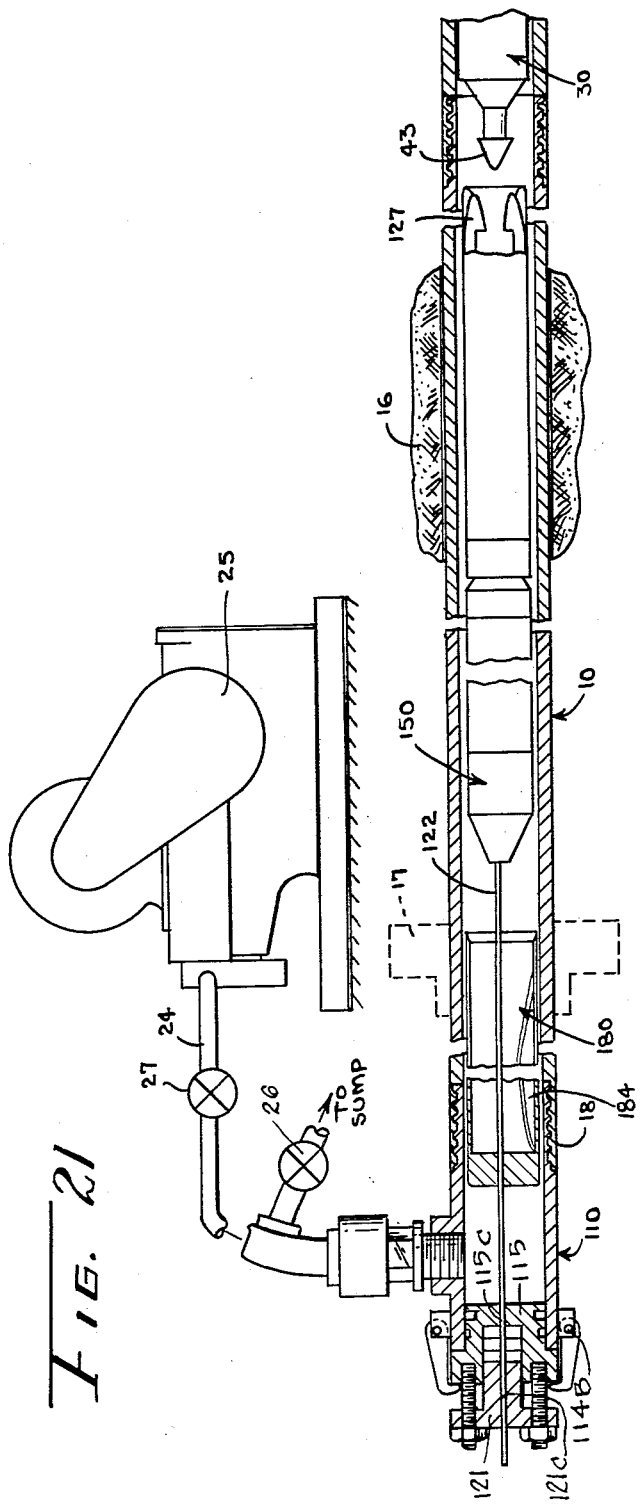

Feb. 4, 1964     A. F. PICKARD     3,120,282
WIRE LINE CORE BARREL IMPROVEMENTS

Filed Sept. 18, 1958     11 Sheets-Sheet 10

INVENTOR
ALBERT F. PICKARD
BY
Ralph L. Dugger
ATTORNEY

Feb. 4, 1964 A. F. PICKARD 3,120,282
WIRE LINE CORE BARREL IMPROVEMENTS
Filed Sept. 18, 1958 11 Sheets-Sheet 11
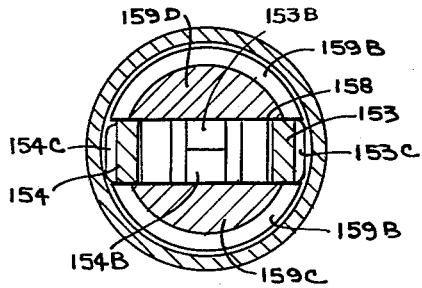
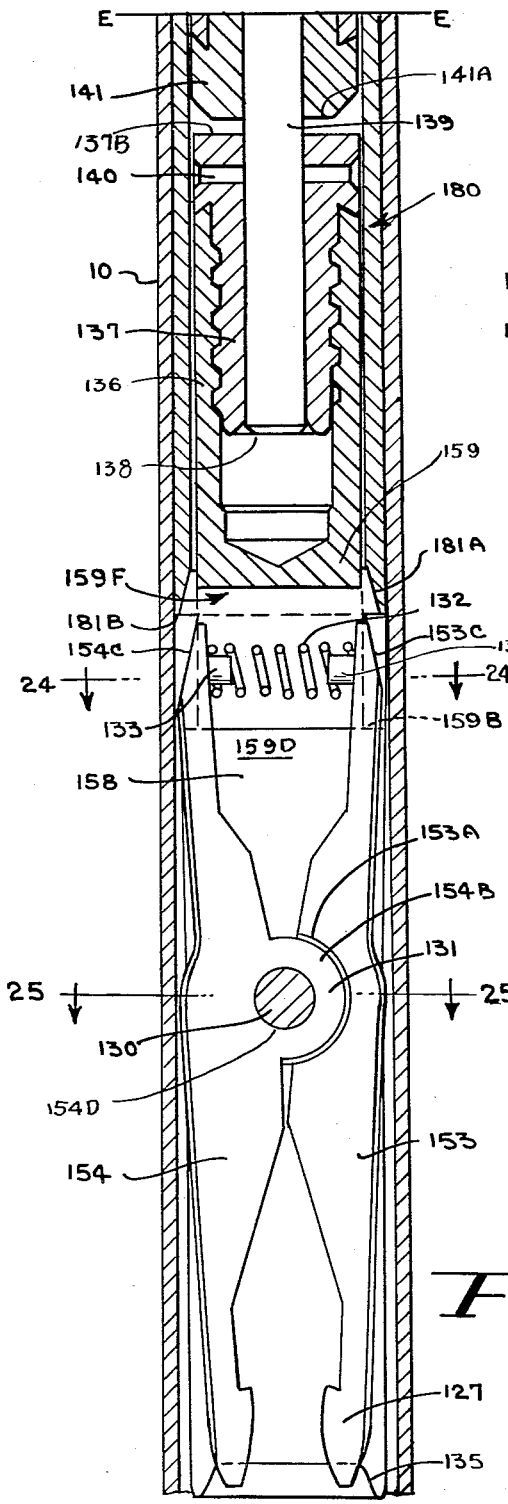
INVENTOR
ALBERT F. PICKARD
BY Ralph L. Dugger
ATTORNEY

United States Patent Office 3,120,282
Patented Feb. 4, 1964

3,120,282
WIRE LINE CORE BARREL IMPROVEMENTS
Albert F. Pickard, Detroit, Mich., assignor to E. J. Longyear Company, Minneapolis, Minn., a corporation of Delaware
Filed Sept. 18, 1958, Ser. No. 761,889
30 Claims. (Cl. 175—214)

This invention relates to the art of deep core drilling in formations where the drilling direction is other than a downward direction and to new and novel improvements in apparatus for so doing. More particularly, this invention relates to wire line core drilling apparatus which can be hydraulically propelled to the bit end of the drill stem, said apparatus including a core barrel inner tube assembly for retaining a core, an overshot assembly for retracting said core barrel inner tube assembly from the bit end of the drill stem, and an overshot release assembly for unlatching an overshot assembly from the core barrel inner tube assembly so that the overshot assembly may be retracted separate from a core barrel inner tube assembly.

Prior to this invention, core drilling using wire line core barrel equipment has been limited to drilling in a vertical or near vertical direction. This limitation resulted since the core barrel inner tube assembly had to be lowered or dropped (freefall) through the drilling tube and recovered by a wire line overshot assembly or a grapple assembly that was similarly lowered or dropped. This invention has been made in an effort to overcome the aforementioned limitations. That is, by using the apparatus of this invention, wire line core barrel equipment can be used for exploratory drilling where the drilling direction is horizontal or even upwardly. To be able to use wire line core barrel apparatus for drilling in a near horizontal or even upward direction is especially important when exploratory drilling is to be done from, for example, the interior of mines, etc.

In other words, the prior art does not teach the use of hydraulic pressure for propelling a core barrel inner tube assembly for other than downward direction drilling and the use of an overshot assembly having a wire line attached thereto for retracting said core barrel inner tube assembly. By using the aforementioned assemblies of this invention only the clear fluid is pumped through the drill stem. Not having to reverse the flow of fluid in the drill stem is advantageous since reversing the flow of the fluid would carry a great deal of solid material back into the interior drill stream and interfere with the operation of the apparatus used for recovering a core sample.

In order that the invention described herein may be more readily understood, the meaning of certain terminology as used in the specification will be set forth. The term "inner" refers to that portion of the drill stem or of an element of an assembly in its position "for use" in a drill stem which is located closer to the bit attached to the drill stem than the other portion of the drill stem or element being referred to, except where the term refers to a transverse circumference or diameter of an element or the drill stem. The term "outer" refers to that portion of the drill stem or of an element of an assembly in its position "for use" in a drill stem which is located closer to the mouth of the drill hole than the other portion of the drill stem or element being referred to, except where the term refers to a transverse circumference or diameter of an element or the drill stem. The terminology "other than a downward direction" refers to the drilling direction which is sufficiently inclined from a downward vertical direction so that apparatus positioned in the drill stem extending in the drilling direction does not "free fall" toward the bit end of the drill stem.

This invention relates to and forms an improvement of the inventions covered by application, Serial No 657,001, filed May 13, 1957, and U.S. Patent Serial No. 2,829,868, issued April 8, 1958, which are incorporated herein by reference.

An object of this invention is to provide improved wire line core barrel apparatus for core drilling when the drilling direction is other than a downward direction. Another object of this invention is to provide wire line core barrel apparatus which may be moved toward the bit end of the drill stem by the use of hydraulic pressure.

A further object of this invention is to provide a core barrel inner tube assembly that may be propelled to the bit end of the drill stem and latched in place by the use of hydraulic pressure. Additionally, an object of this invention is to provide a core barrel inner tube assembly that when positioned for use in the bit end of a drill stem, will allow the fluid for hydraulically propelling it to its position of use to pass through said assembly to circulate around the drill bit.

Still a further object of this invention is to provide core barrel apparatus that may be hydraulically propelled to the bit end of a drill stem for receiving a core sample as it is drilled, a portion of said apparatus being longitudinally moveable relative to the main body of the apparatus for blocking a fluid flow channel through said apparatus while it is being propelled, but opening said channel when the assembly is seated in position for receiving core. Still an additional object of this invention is to provide core barrel apparatus that may be hydraulically propelled to the bit end of a stem for receiving a core sample as it is drilled, a portion of said apparatus being transversely moveable relative to the main body of the apparatus for blocking a fluid flow channel through said apparatus while it is being propelled, but opening said channel when the assembly is seated in position for receiving core.

An additional object of this invention is to provide an overshot assembly that may be propelled to the bit end of the drill stem for retracting a core barrel inner tube assembly from the bit end of the drill stem. The overshot assembly is to be provided with means for unlatching the core barrel inner tube assembly when it is in the core receiving position in the drill stem and means for firmly grasping a portion of said core barrel inner tube assembly such that it may be retracted from the bit end of the drill stem. A still further object of this invention is to provide core barrel apparatus that may be hydraulically propelled to the bit end of a drill stem for retracting a core barrel inner tube assembly, said apparatus having means that provides a fluid flow channel through the apparatus when it is being retracted but blocks said channel when said apparatus is being hydraulically propelled.

Another object of this invention is to provide core barrel apparatus that may be hydraulically propelled to the bit end of a drill stem to attach itself to a core barrel inner tube assembly for retracting said assembly, said apparatus being constructed to be releasably attached to the core barrel inner tube assembly so that it may be detached from the core barrel inner tube assembly to be separately retracted.

Still another object of this invention is to provide core barrel apparatus that may be hydraulically propelled to the bit end of a drill stem for releasing an overshot assembly from a core barrel inner tube assembly so that the overshot assembly may be retracted separate from the core barrel inner tube assembly.

Still another object of this invention is to provide a hydraulic casing head assembly for a drill string tube that may be firmly secured to the head end of said drill string tube and yet easily removed therefrom, said assembly to connect a source of hydraulic pressure to said tube for hydraulically propelling wire line core barrel apparatus to the bit end of a drill string tube. Additionally, it is an object of this invention to provide a casing head assembly for a drill stem which may be removably secured to said drill stem to form a fluid connection between the hydraulic pump and the drill stem when a wire line core barrel inner tube apparatus is to be propelled therein and retracted by wire line means.

Other and further objects are those inherent in the invention herein illustrated and described in the claims, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated in the drawings in which the same numerals refer to corresponding parts and in which:

FIGURE 2 is a vertical elevational view showing the hydraulic mechanism, the fluid connections and drill stem used for drilling in other than a downward direction, the overshot assembly being propelled toward the drill end of the drill stem for recovering a core barrel inner tube assembly, a portion of said overshot assembly being shown in section;

FIGURE 3 is a transverse view of the casing head of the drill stem taken along the line and looking in the direction of the arrows 3—3 of FIGURE 2;

FIGURE 4 is a transverse sectional view of the drill stem casing head taken along the line and looking in the direction of the arrows 4—4 of FIGURE 2, said view illustrating the O-ring, the latch mechanism, and a portion of the gland means with the wire line extended therethrough;

FIGURES 5, 6, 7 and 8 when arranged one above the other with the center lines aligned and with FIGURE 5 at the top, FIGURE 6 immediately below, FIGURE 7 immediately below FIGURE 6, and FIGURE 8 at the bottom, form a composite longitudinal section through the core barrel inner tube assembly and the drill stem, said assembly being shown in a latched position. The meeting line between FIGURE 5 (at the top) and FIGURE 6 (below) is at the line A—A. Similarly the meeting line between FIGURE 6 and FIGURE 7 (immediately below the aforementioned figures) is at the line B—B. Likewise the meeting line between FIGURE 7 and FIGURE 8 (at the bottom) is at line C—C.

Figure 15:
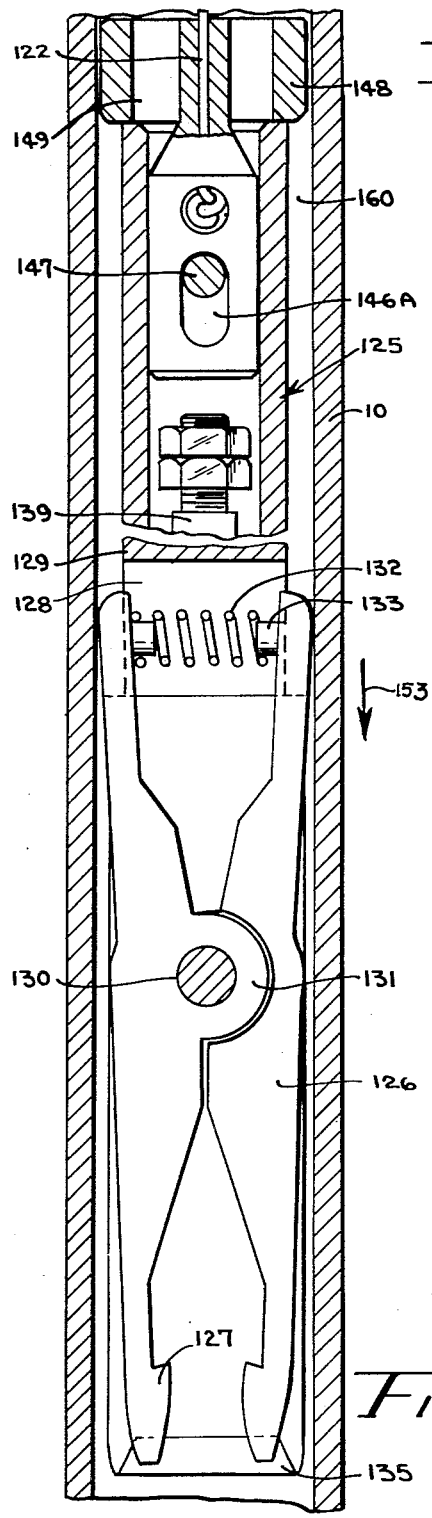
Figure 16:
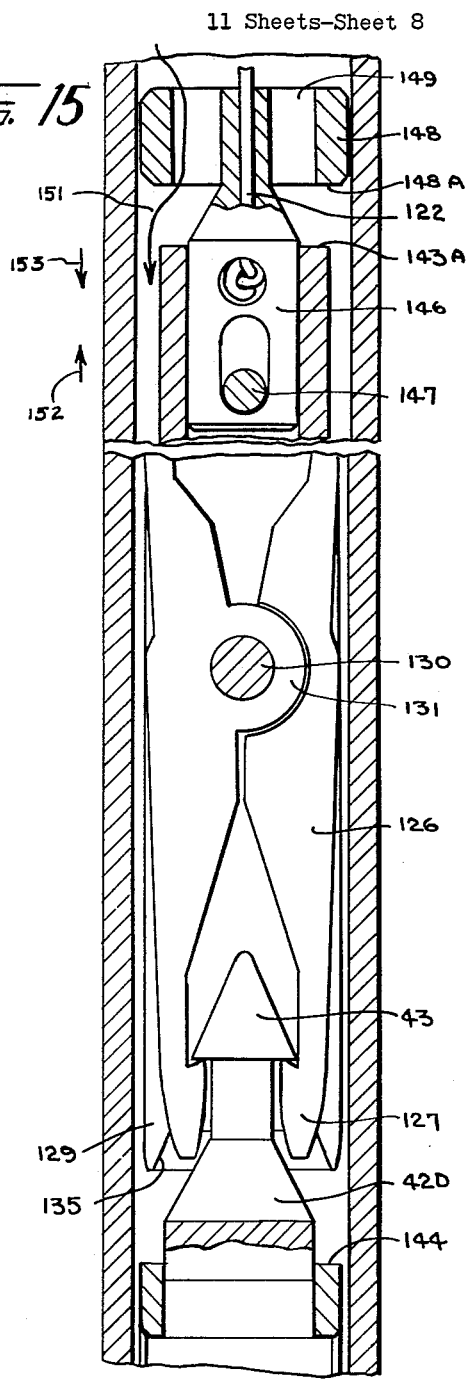
Figure 22:
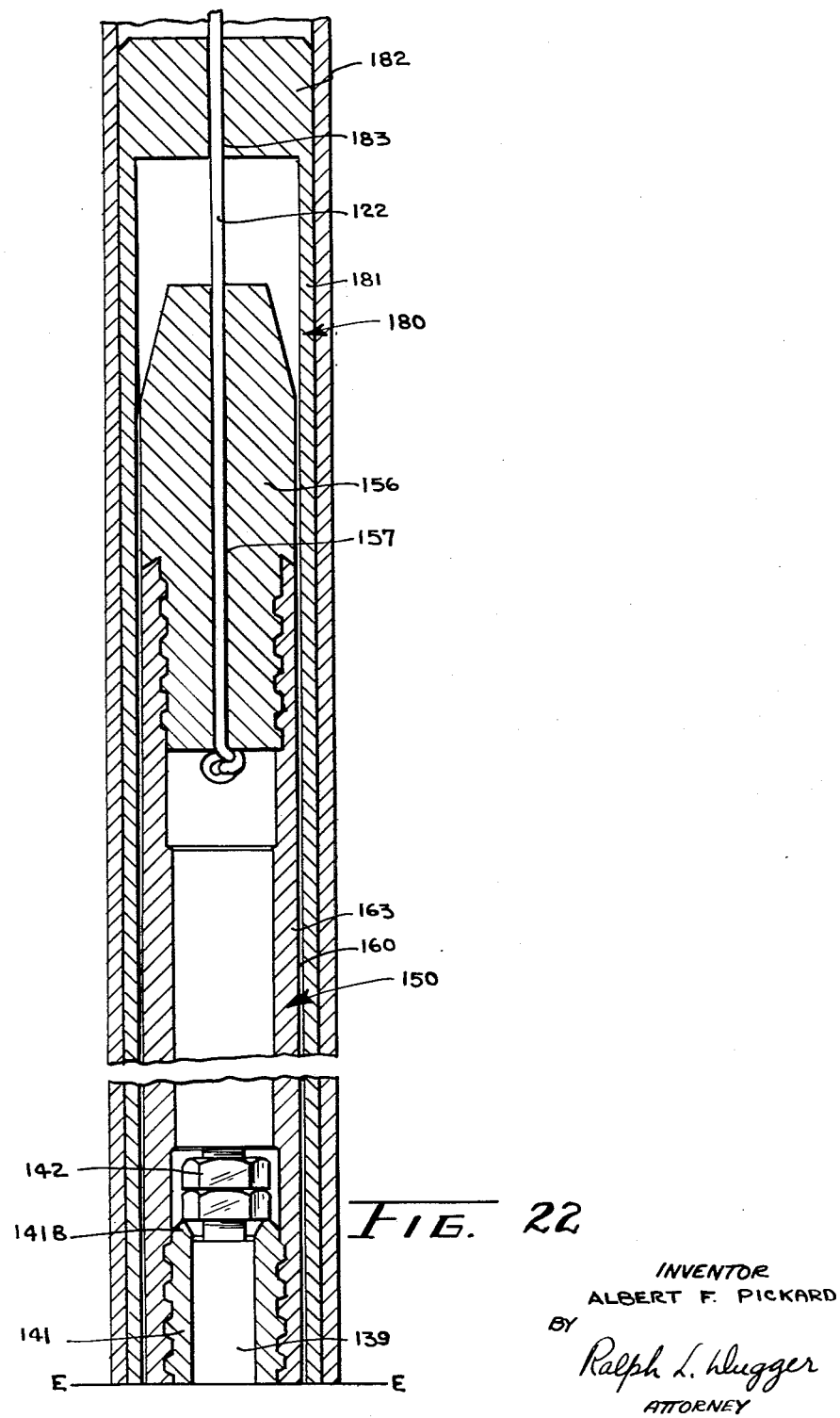

FIGURE 9 is a fragmentary longitudinal section of a portion of FIGURE 7 showing the internal valving which produces a signal to show when the core barrel inner tube assembly is prevented from moving with the drill stem while the drilling operation continues, said valve being shown in a closed position;

FIGURE 10 is a longitudinal section of the outer portion of the core barrel inner tube assembly in a drill stem illustrating the unlatched position of said assembly, said figure being similar to FIGURE 5, except that it shows the relative positions of the members of said assembly when it is being hydraulically propelled;

FIGURE 11 is a longitudinal section of the outer portion of the core barrel inner tube assembly in a drill stem illustrating the unlatched position of said assembly, said figure being similar to FIGURES 5 and 10 except that it illustrates the relative positions of the elements of said assembly when it is being retracted;

FIGURES 12 and 13 when arranged one above the other with the center lines aligned and with FIGURE 12 at the top, and FIGURE 13 at the bottom, form a composite longitudinal section through the overshot assembly in a drill stem. The meeting line between FIGURE 12 (at the top) and FIGURE 13 (at the bottom) is at line D—D;

FIGURE 14 is a transverse sectional view of the piston of the overshot assembly of this invention taken along the line and looking in the direction of the arrows 14—14 of FIGURE 12;

FIGURE 15 is a fragmentary longitudinal sectional view of a portion of FIGURES 12 and 13 which illustrates the relative positions of the members of the overshot assembly as the overshot assembly retracts a core barrel inner tube assembly;

FIGURE 16 is a fragmentary longitudinal sectional view of a portion of FIGURES 12 and 13 which illustrate the relative positions of the members of the overshot assembly as the assembly is propelled by a hydraulic fluid towards the drill end of the drill stem;

FIGURE 17 is a longitudinal section of the upper portion of a second embodiment of the core barrel inner tube assembly illustrating the latched position of said assembly, the portion of said assembly below line Z—Z being the same as the portion of the assembly below line Z—Z of FIGURE 5;

FIGURE 18 is a transverse sectional view of the second embodiment of the core barrel inner tube assembly taken along the line and looking in the direction of the arrows 18—18 of FIGURE 17, said view illustrating the longitudinal milled portion of the plug;

FIGURE 19 is a transverse sectional view of the second embodiment of the core barrel inner tube assembly taken along the line and looking in the direction of the arrows 19—19 of FIGURE 17, said view illustrating the latch dogs in a latched position to illustrate the water flow channel through said assembly;

FIGURE 20 is a transverse sectional view similar to FIGURE 19 except the latch dogs are shown in an unlatched position that closes the water flow channel through said assembly whereby said assembly may be hydraulically propelled;

FIGURE 21 is an elevational view of the hydraulic mechanism, the fluid connections and the drill stem used for drilling in other than a downward direction, the drill stem being shown in sections to illustrate a second embodiment;

FIGURES 22 and 23, when arranged one above the other with the center lines aligned and with FIGURE 22 at the top and FIGURE 23 at the bottom, form a composite longitudinal section through the second embodiment of the overshot assembly and the overshot release assembly of the invention. The meeting line between FIGURE 22 and FIGURE 23 is the line E—E;

FIGURE 24 is a transverse sectional view of the second embodiment of the overshot assembly taken along line and looking in the direction of the arrows 24—24 of FIGURE 23 to illustrate the outer portions of the pulling dogs and their mounting in the overshot body;

FIGURE 25 is a transverse sectional view of the second embodiment of the grapple assembly taken along the line and looking in the direction of the arrows 25—25 of FIGURE 23, said view showing the pivotal mounting of the pulling dogs in the overshot body and the substantial fluid seal formed by said assembly.

Figure 1:
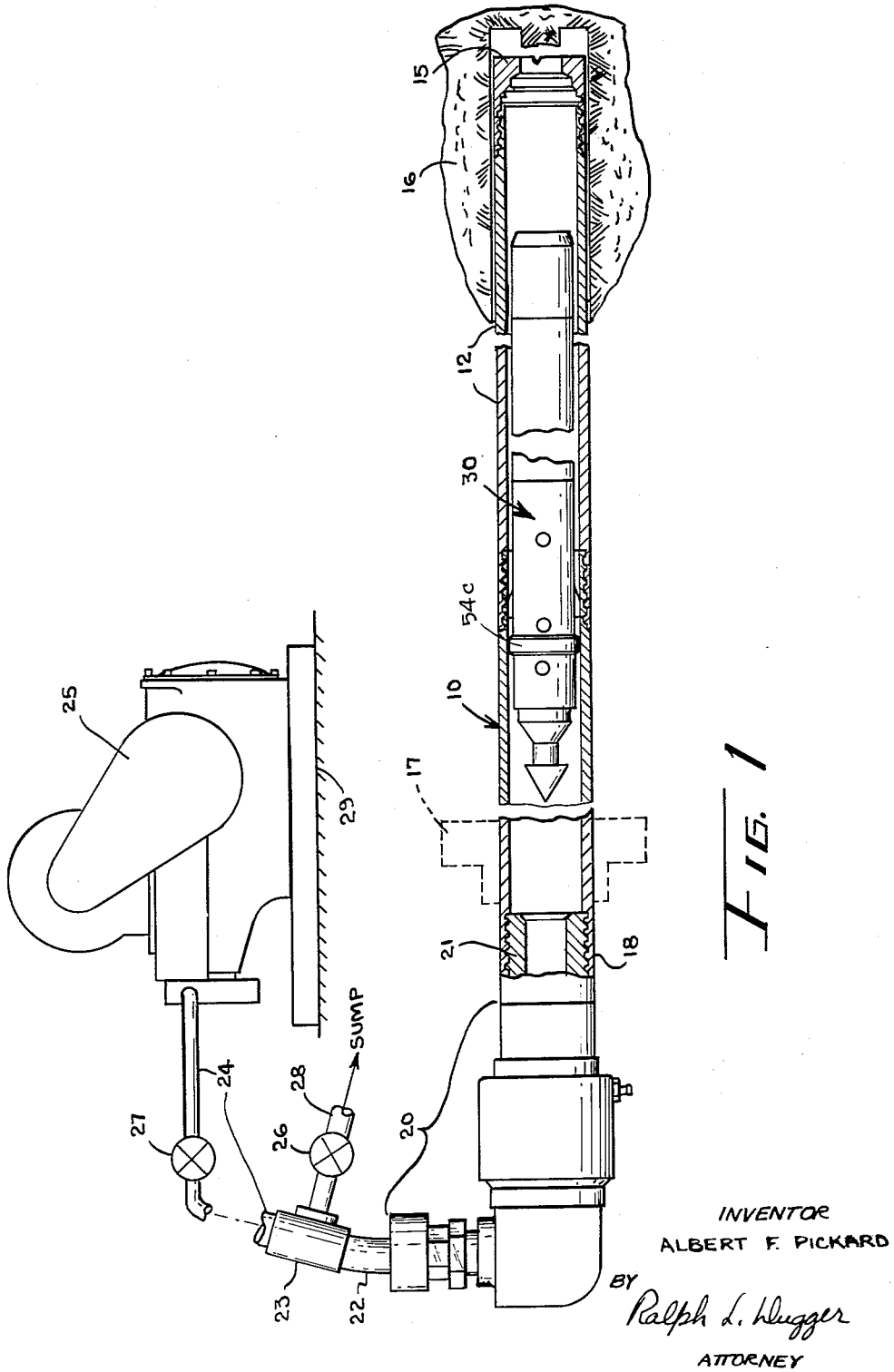
FIGURE 1 is a vertical elevational view of the hydraulic mechanism, the fluid connections, and the drill stem used for drilling in other than a downward direction, the drill stem being broken away in part to illustrate the core barrel inner tube assembly being propelled toward the drill end of the stem.

Referring now to drawings and particularly to FIGURES 1 and 2 there is herein illustrated a hollow drill tube 10 which is made up of sections of pipe coupled together and having a bit 15 at the inner end and being fluidly connected to a hydraulic pump 25 at the outer end, said tube being used to take a core from an earth formation 16. The ends of the pipe are threaded for coupling. In the art, the aforementioned drill tube 10 is sometimes referred to as "drill rod," "drill string," or "drill stem" but it will be referred to hereinafter as a "drill stem." As may be noted in FIGURE 1, the longitudinal axis of the drill stem extends in a horizontal direction such that a core sample may be drilled from an earth formation in other than a downward direction. As will subsequently appear, the apparatus of this invention is particularly useful where wire line core barrel equipment is used for recovering core samples where the direction of drilling is inclined from the vertical such that the equipment will not freefall to the bit end of the drill stem.

A chuck 17 is mounted on the outer end portion of the drill stem for driving said stem. The chuck is driven in conventional manner by power means (not shown), said means not forming a part of this invention and therefore will not be further described.

In order that the core barrel inner tube assembly 30 may be hydraulically propelled to the bit end of the drill stem, a water swivel and appropriate fluid lines, valves are provided for fluidly connecting the hydraulic pump 25 to the drill stem, said pump being mounted on a horizontal base 29. The water swivel enclosed under the bracket 20 is threadedly connected to the outermost end of the drill stem 10, the male threaded portion 21 of the swivel being attached to the female threaded end 18 of the drill stem. The water swivel is of conventional construction and therefore will not be further described.

The water swivel 20 is fluidly connected to the hydraulic pump 25 by pipe 22, T-joint 23, and pipe 24, the pipe 22 being connected to the opposite end portion of the water swivel from portion 21. The T-joint 23 is connected intermediate the hydraulic fluid pressure pipes 22, 24 so that the exhaust line 28 may be fluidly connected into the hydraulic pressure system. The exhaust line 28 extends from the T-joint to a sump, there being an exhaust valve 26 located in said line. A pressure control valve 27 is located in the pipe or pressure line 24 between the T-joint and the pump 25.

The drill stem 10 is hollow and at its inner end a core barrel outer tube assembly 12 is attached for receiving and retaining the core barrel inner tube assembly generally designated 30, said core barrel inner tube assembly being hydraulically propelled to the drilling position through the use of the apparatus previously described. The structure of the core barrel outer tube assembly will in part be set forth hereinafter, a more complete description of the assembly which may be used can be found in U.S. Patent 2,829,868, issued April 8, 1958.

The core barrel outer tube assembly 12 is comprised of a core barrel outer sleeve 36, a reaming shell 37 having female threads 37A at the upper end for connecting said shell to said sleeve and hard material such as diamonds on the outer reaming surface at 37B, and a drill bit 15 for drilling into the formation 16 from which the core sample is to be taken, said bit being connected at the threaded male end 37E of the inner end of the shell. The outer end of the core barrel outer tube assembly includes a coupling 31 which connects said assembly to the drill stem. At the opposite end of the coupling 31 from the drill stem 10, a sleeve 32 is connected, said sleeve terminating at the opposite end with a threaded male end 32A. To the threaded male end 32 there is attached a wear coupling 33 having hardened lands 34 thereon. The wear coupling also terminates at a male threaded end 33A.

The end 32B of the sleeve 32 in conjunction with recess 33C forms a seat inside the surface of the wear coupling against which the latch dogs 40A, 40B of the core barrel inner tube assembly seat for retaining said core barrel inner tube assembly from outward movement. Also the end 32B has a projection flange 32D which extends as a partial cylindrical surface around and from the surface 32B. The side faces of this flange bear against the faces of the latch dogs and hence cause them (and everything propelled thereby) to rotate with the drill stem when said latch dogs are in a latched position as shown in FIGURE 5. Thus the recessed portion enclosed between the sleeve end 32B and the lower end of the wear coupling forms a space in which the latch dogs may be extended transversely to a latched position. To the opposite end of the wear coupling from the sleeve 32, a hanger coupling 35 is connected.

The hanger coupling has an internally thickened wall 35A, the outer end of which forms a frustoconical shoulder or seat 35B for the seating of shoulder or flange 45A of the core barrel inner tube assembly. The seat 35B functions as a retaining flange which prevents the core barrel inner tube assembly from being further propelled in the direction toward the bit 15. The surfaces of seat 35B and seating flange 45A interrupt the fluid flow path through the annular space 167 between the hanger coupling and the core barrel inner tube assembly. The hanger coupling 35 terminates at female threads 35C for furnishing a connection for the male threaded end of the core barrel outer tube assembly.

Referring now to FIGURES 5 through 8, inclusive, the structure of the first embodiment of the core barrel inner tube assembly will be set forth. A more detailed description than given hereinafter of some of the members of the core barrel inner tube assembly and of the drill stem may be found in U.S. patent application, Serial No. 657,001.

The entire core barrel inner tube assembly 30 is constructed so that it can be hydraulically propelled through the drill stem and retracted by a grappling tool or overshot assembly when the latch dogs 40A, 40B are in an unlatched position. Further, the aforementioned core barrel inner tube assembly is constructed such that it may be hydraulically propelled through the drill stem and seated in the position illustrated in FIGURES 5–9 for receiving a core sample as it is drilled by bit 15.

The core barrel inner tube assembly 30 is prevented from coming into direct contact with the bit when it is propelled to the inner end of the drill stem by the suspension fitting 45 which has a seating flange 45A that sits on the seat 35B of the hanger coupling. That is, the seating flange nests on the circular shoulder formed by seat 35B. The generally cylindrical suspension fitting extends outwardly from the aforementioned seating flange and narrows at the outer portion. The outer end 45B of the suspension fitting is a cylinder of reduced diameter such that the dog retractive sleeve 54 may be slideably mounted thereon, the inner end 54A of said sleeve abutting against the shoulder 45C of said fitting when the core barrel inner tube assembly is "seated" or being hydraulically propelled.

The dog retractive sleeve 54 extends outwardly beyond the outer end of the suspension fitting to the outer edge 45E. An elongated rectangular slot 48 is milled out of the central portion of the outer end 45B of the suspension fitting, said slot extending from the line 45D to the outer edge 45E.

A through pin 55 is mounted in the milled out portion of the suspension fitting or latch body 45B to extend through the slot 84. Pin 55 serves as a pin locator for the two latch dogs 40A, 40B which are pivotally mounted on said pin in side by side relationship in slot 48. The hole 40C in the latch dogs through which the pin is inserted is a little larger than the pin.

Each of the latch dogs are of long, flat, elongated construction and are spring biased outwardly by springs 62 which are attached (one to each dog) by rivets 62A to the edge of the dogs opposite the cut-out 40E. The opposite end of the springs bears against the inner periphery of the dog retractor sleeve. Additionally each of the latch dogs is machined off with smooth bottom radii at 40D and under both dogs is a support block 57 which has a matching curvature 57D. When the bottom radii 40D of the dogs rest on block 57, the pin 55 has slight clearance all around in hole 40C. Block 57 is held in place in the inner portion of slot 48 by a rivet 56 which extends radially outwardly through the slots 84 to approximately the outer diameter of the tube 54, said slots 84 being formed in the dog retractor tube transverse to slots 48.

Axially extending elongated slots 54B are formed in the side portions of the tube 54 such that the latch dogs 40A and 40B may be extended therethrough to a latched position.

When the core barrel inner tube assembly is in a seated position for receiving the core as drilled, the inner edge 54A of the dog retractor sleeve rests on or closely adjacent the shoulder 45C of the suspension fitting. At the same time the rounded portion 40D of the dogs 40A, 40B may bear against the block 57 and the edge 32B of the sleeve coupling may bear against the cut-out 40E formed in the outer edge positions of said dogs to hold the core barrel inner tube assembly in a core receiving position during the drilling operation.

A plug 41 is slideably mounted in the outer end of the dog retracted sleeve 54. The main body portion 42 of the plug has an outer diameter substantially equal to the inner diameter of the dog retractor sleeve, said portion having a transverse slot or aperture 44 formed in the central portion thereof. A pin 49 is mounted in appropriate apertures formed in the dog retractor sleeve and extended through the aforementioned slot formed in the plug. Since the height H of the slot is substantially greater than the diameter of the pin, the plug may be slideably moved in the dog retractor sleeve and yet partially retained therein.

A spear point 43 is formed on an outer extension of the plug, said spear point extending outwardly beyond the outer end of the dog retractor sleeve. The purpose of forming the spear point on the plug will be set forth hereinafter. The longitudinal axis of the spear point coincides with the longitudinal axis of the dog retractor sleeve and the plug is of a sufficient length so that the inner end portion 42D and the ridge 46 formed integral with said end portion will abut against the latch dogs in the latched position as illustrated in FIGURE 5.

A circumferential groove 42A is cut in the surface of the plug between the slotted portion 44 and inner end portion 42D. The axial length L of the groove is sufficient so that the outer edge of the groove extends from a point outwardly beyond the spaced aperture 53 formed in the dog retractor sleeve to a point inwardly beyond the enlarged diametric portion 54C which substantially forms a fluid seal in the drill stem when the core barrel inner tube assembly is in a seated position. The portion 54C also prevents the hydraulic fluid from by-passing the core barrel while said barrel is being propelled from the fluid swivel end of the drill stem to the bit end of said drill stem. At the aperture 53, the fluid flows radially inwardly into the circumferential groove 42A formed in the plug and then radially outwardly through the slots 54B located inwardly beyond the enlarged diametric portion of the dog retractor sleeve into the annular space 167.

The inner end portion 42D has an outer diameter that forms a close fit with the inner diameter of the dog retractor sleeve when the plug is retracted to the position shown in FIGURE 10. A ridge 46 which extends inwardly is formed on the central inner surface of said inner end portion. The aforementioned ridge fits in a channel formed by the latch dogs when said dogs are in the latched position (FIGURE 5), the radial length of the ridge being slightly less than the thickness of the slot 48. The ridge in conjunction with the springs 62 force the latch dogs to a fully open or latched position and retains them in said position during the core drilling operation.

The length of the groove 42A that opens into the slot 54B is less than the axial movement of the plug relative to the pin 49. As a result, the plug may be slideably moved outwardly in the dog retracting sleeve a sufficient distance such that the end portion 42D in conjunction with the enlarged diametrical portion 54C of the dog sleeve forms substantially a fluid seal in the hollow portion of said sleeve.

The inner portion of the core barrel inner tube assembly located inwardly from the suspension fitting is as follows. Located immediately outwardly from the shoulder 45A of the suspension fitting 45 are a plurality of cross bore fluid inlet holes 64. Inwardly from the fluid inlet holes, the fitting is bored out at 71 and is internally threaded at 45H. At the upper part of the bore 71, the bore continues to form a valve chamber 66 which has a seat at 62 and continues at a reduced diameter 63 to intersect the cross bores 64. A ball check valve 68 is held against seat 62 by a spring 69 which bottoms on a pipe plug 70 threaded into the inner end of the valve chamber.

A bearing tube 72 having a flange 72A and a reduced end portion 72B is threaded into the inner end of the suspension fitting. A rubber collar 78 is seated on the flange 72A and below it is a metal collar 86. The collar 86 is slideably mounted on a reduced end portion 72B. When the collar 86 is pushed outwardly relative to the flange (FIGURE 9 position), the rubber collar 78 will be axially compressed and radially expanded until it reaches the inner wall of the core barrel outer tube 36, thus pinching off or valving the annular space 167. The rubber collar acts as a valve when an outward push of the core barrel inner tube occurs from the tube being filled with core or when the core jams in the tube.

At the inner end of the bearing tube and connected to the outer end of the core barrel inner tube 80 is a bearing element 65 having an outwardly extending end shaft 76 secured thereto, said shaft being journaled in the bearing tube 72. Mounted on the end shaft 76 between the metal collar 86 and the outer end surface of the bearing element are wear washers and a small thrust bearing assembly designated by reference numeral 79. The outer end of the shaft 76 is threaded and the small thrust bearing assembly 74 is held in place against nut and lock nut 75 by a small compression spring 73 that bears against the outer end of the bearing tube 72. A relief port 68A is provided in the inner end of the bearing element 65 to extend into the longitudinal bore formed therein.

A core lifter outer tube 83 having a core lifter ring 82 mounted therein is threaded on the inner end of the core barrel inner tube. The inner end of the core lifter outer tube is held in position spaced from the bit 15 to provide a fluid path from the annular space 167 between the core barrel inner tube and the core barrel outer tube to the outside of the bit.

The structure of the first embodiment of the core barrel inner tube assembly having been set forth a second embodiment of said assembly will now be described. The second modified embodiment of the core barrel inner tube assembly 90 (see FIGURE 17) from the line Z—Z inwardly is the same as the first embodiment described and illustrated from the line Z—Z of FIGURE 5 inwardly and in FIGURES 6-8 inclusive; and therefore will not be further described. As may be noted in FIGURE 17 the portion of the dog retractor sleeve 92 outwardly from the latch dogs 95, 96 has an enlarged outer diameter portion 92A which forms a close fit with the inner diameter of the drill stem 10. A plug 93 having a spear point 43 is fixedly mounted in the outer end portion of the dog retractor sleeve by a pin 49. The plug has a longitudinal section milled away to form the channel 101 between said plug and the inner peripheral surface of the dog retractor sleeve.

Mounted inwardly from the plug 93 in the dog retractor sleeve 92 is a latch body 91 having an elongated slot 97 formed in the central portion thereof to form segments 91C and 91D. The latch body is similar in structure to the one described for the preferred embodiment. However, it is to be noticed that the outer surface 91A of the latch body extends to a point adjacent to the inner surface of the plug to enclose a cylindrical space 94 within the dog retractor sleeve.

Also the latch body has a pair of longitudinal grooves 102 formed in diametrically opposite peripheral portions thereof to form fluid channels. As may be noted in FIGURE 17, the grooves or fluid channels 102 extend from the outer end 91A of the latch body inwardly to apertures 59, 60 and then narrows to a point on the peripheral surface of the latch body adjacent the pin 55. When the latch dogs are in a latched position the apertures 59 and 60 open into the large groove portion 102A, (see FIGURES 17 and 19). Thus a fluid flow path 168 is established from a point outwardly of the spear point to the apertures 59, 60 enclosed by the drill stem and the dog retractor sleeve.

The slot 92B may form a "loose fit" with the longitudinal surfaces of the dogs or else the slot may have an enlarged portion 92C extending inwardly from a point adjacent apertures 60 to the inner end of the slot 92B to allow fluid to pass from apertures 59, 60 radially outward through the dog retractor sleeve. Providing an enlarged portion 92C, (FIGURE 17), the latches substantially block the fluid path.

When the core barrel inner tube assembly 90 is in a seated latched position, the dogs 96A and 96B are in the positions illustrated in FIGURES 17 and 19. In this position the fluid may flow along the fluid path 168 inwardly past the spear point through the fluid channel 101 and into the cylindrical space 94. At the cylindrical space 94 the path of fluid flow 168 separates, part of the fluid going into each of the grooves 102. The fluid flows through the groove 102A, next through apertures 59, 60 then along the respective end faces 95A, 95B of the dogs adjacent the apertures 59 and 60 and finally radially outward through the enlarged portion 92C into the annular space 167. However, when the dogs are in an unlatched position, for example, when the assembly 90 is first inserted in the drill stem (FIGURE 20), the apertures are located closer together and thus the fluid path is blocked by the respective portions of the adjacent side surfaces of the latch dogs. Thus the dogs in an unlatched position form valves to block the water flow path 168 through the core barrel inner tube assembly. Similarly the enlarged diameter portion 92A of the dog retractor sleeve in conjunction with the inner peripheral portion of the drill stem nearly forms a fluid seal. Thus, relatively small hydraulic pressure loss results from fluid passing through or around the members of the core barrel inner tube assembly to the inner end thereof. As a result of the aforementioned structure, the core barrel inner tube assembly 90 may be hydraulically propelled to the bit end of the drill stem and when latched in position the fluid flow path 168 will again be established to allow fluid to pass from the outer end of said assembly to the bit of the core drilling unit.

When it is desired to remove the core barrel inner tube assembly 30 or 90 from the drill stem 10 as for example when the "core" is to be withdrawn, the water swivel 20 is disconnected from the fluid circuit between the hydraulic pump 25 and the female threads 18 at the head end of said drill stem. In place of the water swivel 20, a drill stem casing head, generally designated as 110, is attached at the head end 18 of said drill stem after an appropriate grapple tool or overshot assembly has been inserted in the head end of the drill stem (see FIGURE 2).

The drill stem casing head 110 includes a head coupling 111 having male threads at one end thereof which are threaded into the head end 18 of the drill stem and having a transverse aperture 111A formed in the intermediate circumferential portion into which one end of the water swivel 112 is threaded. The opposite end of the water swivel is fluidly connected to the pipe 22.

On the outer circumferential surface of the head coupling 111 adjacent the outer edge thereof, two pairs of spaced plates 113 are located diametrically across from one another. A latch 114 having a hooked end 114A is pivotally mounted between each of the plates on a pivot pin 114B. The latched position of the latches 114 is shown in solid lines while the unlatched position is shown in dotted lines (FIGURE 2).

A stuffing box 115 having a recessed portion 115A is inserted into the open end of the head coupling and is secured therein by rotating the hook end of the latches over the outer peripheral flange 115B, said flange having an outer diameter greater than the inner diameter of the drill stem. A pair of spaced O-rings 116, 117 are positioned on the outer peripheral portion of the stuffing box which is inserted in the drill stem, said O-rings being located in peripheral grooves formed in said peripheral portion of the stuffing box. The cylindrical recessed portion 115A is formed in the central portion of the stuffing box such that a gland 121 may be mounted therein.

The gland 121 is secured to the stuffing box by four spaced stud bolts 119 which are inserted through appropriate apertures formed in the flange portions 121A of said gland. The stud bolts are inserted through the aforementioned apertures and screwed into threaded longitudinal apertures formed in the stuffing box 117, the opposite end of the stud bolts having nuts 120 to secure the gland in position. A central opening 121C, 115B extends through the gland and the stuffing box respectfully so that the wire line 122 may be inserted therethrough. The gland and stuffing box may be formed from split sections to facilitate insertion of the wire line into the central opening.

Although a specific drill stem casing head structure has been set forth, it is to be understood that this is not to constitute a limitation on the invention since other structural members may be used to perform the same functions as the drill stem casing head herein described.

To retract the core barrel inner tube assembly 30 or 90 from the bit end of the drill stem, an overshot assembly that grasps the spear points 43 which in turn retracts the latch dogs is provided. Ordinarily the overshot assembly is simply dropped down the drill stem on the end of a wire line, and the overshot assembly may be used to provide a hammering effect for hammering loose the latch dogs when necessary. However, to provide means for retracting the core barrel inner tube assembly when said assembly is used for recovering core samples from drillings in other than a downward direction a new and improved overshot assembly, generally designated 125, has been invented.

The grappling tool or overshot assembly having a wire line 122 attached thereto after being placed in the drill stem is hydraulically propelled towards the core barrel inner tube assembly which is to be withdrawn. The overshot or grapple assembly includes the overshot body 129 which is generally cylindrical in shape and has an elongated rectangular slot 128 milled out of the inner central portion thereof to form the two integral overshot body segments 129A therewith. The transverse cross section of each of the segments is of a similar shape and area but are positioned 180° relative to the other. The longitudinal length of the slot extends outwardly to the line 129B. A pair of pulling dogs 126 having jaws 127 which are shaped for retaining a spear head 43 therebetween (see FIGURE 15) are provided. The pulling dogs 126 are disposed in a generally face-to-face relation in an elongated transverse slot 128 in the overshot body 129 and are pivotally mounted on a pin 130 extending through the overshot body and through the partially cut away and over-lapping hub portions 131 of the pulling dogs. A coil compression spring 132, which is seated upon pins 133 welded to the outer ends of the pulling dogs, normally urges the outer ends of the dogs apart, and thus normally urges the jaws 127 together in grasping position while permitting expansion of the jaws to slide over the top of the spear head 43 when the overshot assembly is propelled to the bit end of the drill stem. The inner end portion of the overshot body, below the slot 128 containing the pulling dogs, forms a split collar or frusto-conical shoulder 135 that sits down over a corresponding cylindrical projection forming the outer end 144 of the dog retractor sleeve (FIGURE 15) and imparts stability to the entire assembly 30 in respect to the overshot assembly 125 (see page 19) as said assemblies 30, 125 are retracted through the drill stem.

The frusto-conical shoulder 135 formed on the lower end of the overshot body aids in centering the overshot assembly over the spear point, the inner surface of said shoulder being similarly shaped and slightly larger than the frusto-conical portion of the plug. The outer end 136 of the overshot body is internally threaded to have threaded therein a companion inner jaw element 137 having a central aperture 138 into which one end of a rod 139 is fitted and is held in place by pin 140. Fitted over the outer end of rod 139 is in externally threaded outer jaw element 141. The outer end of the rod 139 is threaded and nuts 142 are locked in place thereon. The outer jaw element 141 is coupled into the lower end of a section of tube 143.

The shaft 139 is slideably mounted within the outer jaw and the tube 143. However, the end surface 141A of the outer jaw 141 encountering the adjacent surface of the inner jaw 137 limits the slideable movement in one direction whereas the end surface 141B encountering the surface of the nut 142 limits the slideable movement of members 141, 143 in the opposite direction.

The piston 148 has an outer peripheral surface which forms a close fluid fit with the inner surface of the drill stem 10 to prevent any substantial amount of fluid bypassing the overshot assembly when said assembly is fluidly propelled from the fluid swivel end of the drill stem to the bit end of the drill stem, said piston being slideably attached to the outer end of the tube 143. An elongated piston rod 146 that has an outer peripheral surface that forms a close fit with the inner surface of the tube 143 is formed integral with the piston 148 and has a common longitudinal axis therewith. A pin 147 secured in the outer end portion of the aforementioned tube 143 is extended through an elongated transverse slot 146A formed in the piston rod to slideably retain said piston rod within said tube. The pin and the slot 146A are located such that the surface 148A of the piston will form a substantial fluid seal with the end 143 of the tube when the piston is in its "fluid propel" position as shown on FIGURE 12.

A transverse opening 146B is formed in the piston rod, said opening being located between the slot 146A and the connection of the piston rod to the piston 148. Extending axially from the opening 146B is a wire line or cable aperture 148B, said cable aperture extending through the piston 148. The aforementioned apertures 146B, 148B form an attachment for a wire line or a cable 122 which may be passed through said aperture 148A and knotted or otherwise fastened in aperture 146B.

A plurality of spaced fluid channels 149 are formed in the piston, said channels extending substantially parallel to the longitudinal axis of said piston. The fluid channels are located inward from the outer periphery of the piston such that when the surface 148A engages the surface 143A of the tube, the fluid flow path from the one side of the piston through said channels into the annular area 160 between the tube 143 and the drill stem 10 is blocked.

When it is desired to retract the core barrel inner tube assembly from the bit end of the drill stem, the aforementioned overshot assembly 125 is inserted into the drill stem 10. After the drill stem casing head 110 has been properly secured on the end of the drill stem 10 and the proper fluid connections have been made to the hydraulic pump 26, the overshot assembly may be fluidly propelled to the bit end of the drill stem. The fluid pumped into the drill stem will exert a fluid pressure against the outer surface 148C of the piston. The piston rod being freely slideable in the tube 143, the piston will be pushed from a position shown in FIGURE 15 to the position shown in FIGURE 16 (in the direction of the arrow 153). The piston having been moved to the "overshot fluid propelled position" (FIGURE 16), the fluid flow path 151 through the water channel 149 will be blocked due to the engagement of the surface 148A of the piston with the upper end 143A of the tube. Thus the force exerted on the piston by the fluid will be transmitted to the tube to propel the overshot assembly in the direction of the arrow 153. The overshot assembly being propelled in the aforementioned direction, the tube and the outer jar element and elements secured thereto will slide along the shaft 139 so that the surface 141A will abut the surface 137A of the inner jaw.

The fluid will propel the overshot assembly with sufficient force such that when the jaws 127 of the pulling dogs come into contact with the spear head, they will be forced apart against the resiliency of spring 132 (as previously mentioned the conical shoulder 135 helps aid centering the jaws in position over the spear head.). The jaws having slipped over the spear point will then snap shut inward of the conical base of said spear head (see FIGURE 5).

However, in the event that the jaws do not close over the spear point on the first attempt, the cable 122 may be pulled in a direction of the arrow 152 to partially retract the overshot assembly. In retracting the cable, the piston is moved in the direction of the arrows 152 (FIGURE 15) to open the fluid flow channel 151 before a substantial pulling force is exerted on the pin 147. Further retracting the cable will pull the overshot assembly away from the spear point. Now fluid may again be pumped through the drill stem to exert hydraulic pressure against the piston to move said assembly in the direction of the arrow 153 as previously set forth. Appropriately using fluid pressure to propel the overshot assembly in the direction of the arrow 153 and partially retracting said assembly by pulling outwardly on the cable will permit a hammering action to be effectuated to force the jaws 127 over the spear point of the core barrel inner tube assembly.

The same type of the aforementioned hammering action may also be effectively used in delivering a sharp blow to the dog retractor sleeve of the core barrel inner tube assembly for unlatching the latch dogs.

Once the latch dogs are unlatched, the core barrel inner tube assembly may be retracted in the drill stem by withdrawing the cable 122.

When either the overshot assembly by itself or in conjunction with the core barrel inner tube assembly 30 are being retracted, the exhaust valve 26 may be opened to reduce the fluid resistance to the retraction of said assemblies.

One modification of the overshot assembly having been set forth I will now proceed to describe a second embodiment of an overshot assembly which may be used for retracting a core barrel inner tube assembly of this invention when cores are drilled in other than a downward direction. Referring to FIGURES 21–23, inclusive, there is illustrated a second embodiment of the overshot assembly which is usable for retracting a core barrel inner tube assembly, said embodiment being generally designated as 150. In setting forth the description of the modification of the overshot assembly 150 the parts which are used in both modifications will bear the same reference numerals.

The overshot assembly 150 includes an overshot body 159 having an elongated slot 158 formed in the central portion thereof similarly as the elongated slot 128 was found in the overshot body 127 of the first embodiment. A pair of pulling dogs 153, 154 are mounted in the slot 158 on pin 130.

Referring to FIGURES 23–25 inclusive, the mounting of the pulling dogs 153, 154 and the structure thereof will now be set forth in greater detail. The dogs 153 and 154 are substantially identical except that one is a right hand dog and the other is a left hand dog. Therefore in describing the structural elements of one dog, it will be apparent that the other dog has a structural counter-part.

A semicircular recess 153A is formed in the mid-portion of the dog 153 such that the hub 154B of dog 154 may be pivotally mounted therein. By locating the hub 154B in the recessed portion 153, the pin 130 may be inserted through the aperture 154D and thus extend through the recess 153A. The radius of curvature of the recessed portion 154A is only slightly larger than the radius of curvature of the hub 153B, thus a near fluid seal is formed in this portion of the dogs. Similarly the hub 153B is pivotally mounted on pin 130 and fits in the recess 154A. Thus the pulling dogs in conjunction with the latch body along section line 25—25 substantially fill the hollow cross sectional area of the drill stem. In other words, due to the relative close tolerance of the dogs 153, 154, pin 130, the overshot body segments 159C, 195D, and the drill stem, only a small volume of fluid may pass around the overshot assembly to the opposite side thereof in the drill stem.

A shoulder 159B is formed on the overshot body outwardly from the dog mounting pin 130, said shoulder being formed adjacent pins 133. It is to be noted that the shoulder 159B is formed by reducing the radius of the overshot body from a point adjacent the inclined ends of the dogs to the outer end of the body. The aforementioned shoulder is made up of two annular sectors, one being located on either side of the pulling dogs. Slightly above the location of the shoulder 159B, each of the pulling dogs has an inclined surface 153C, 154C which is inclined radialy inwardly and outwardly from the position where said dogs are nearest the drill stem. The inclining surfaces 153C and 154C are formed for purposes to be set forth hereinafter. The inclined surfaces extend toward the longitudinal axis of the latch body such that the dogs have a maximum diametrical dimension of the outer radial portions thereof which is less than the outer diameter of the overshot body at the outer edges of said surfaces.

The overshot body 159 is secured to the inner jaw 137 similarly as the overshot body 125 of the previously described embodiment. The aforementioned inner jaw 137 is mounted on shaft 139 by the pins 140.

Mounted on the opposite end of the shaft from the inner jaw is an outer jaw 141, said jaw being slideably mounted on the shaft and retained thereon by nuts 142 and the surface 137B similarly as was in the embodiment previously described. The inner end of tube 163 (FIGURE 22) is connected to the threaded end of outer jaw 141. The threaded end 156A of the wire coupling element is secured in the outer end of the tube 163, said wire coupling element 156 having a central aperture 157 through which the wire line or cable 122 may be passed and knotted or otherwise fastened.

It is to be noted that the maximum outer diameters of the wire coupling element 156, the tube 163 and the inner jaw 141 are substantially the same. Similarly the diameter of the inner jaw and the outer portion of the overshot body are substantially equal to the maximum outer diameter of the aforementioned elements. As a result an annular space 160 is left between the radial outer portion of the overshot assembly outwardly from the aforementioned shoulder 159B and the adjacent inner surface of the drill stem 10. The only portion of the overshot assembly extending into the space 160 is the outer portion of the pulling dogs including the inclining surface 153C, 154C.

In the event that the second embodiment of the overshot assembly 150 having a core barrel inner tube assembly 30 or 90 attached thereto becomes stuck, or that in the attempt to retract the core barrel inner tube assembly 30 sufficient force cannot be exerted through the overshot assembly 150 to unlatch said assembly, it may be desirable to recover the said overshot assembly and leave the core barrel inner tube assembly in the drill stem. In order to release the pulling dogs 153, 154 from the spear point of the core barrel inner tube assembly, an overshot release assembly has been provided, said assembly being generally designated by reference numeral 180.

The overshot release assembly is made up of an overshot release tube 181 and an end wall 182. The transverse dimensions of the release tube are such that it will fit within the annular space 160 between the overshot assembly 150 and the drill stem, the outer peripheral surface of the release tube forming a close fit with the inner diameter or surface of the drill stem. A central aperture 183 is formed in the end wall such that the cable 122 may be extended therethrough. The inner longitudinal length of the tube 181 is greater than the extended length of the overshot assembly 159B outwardly to the outer end of the wire coupling element 156.

The overshot release tube assembly has a narrow winding slot 184 running the longitudinal length of its side so that said assembly may be slipped on the cable 122 and then slid down on the wire in the drill stem or hydraulically propelled along the cable toward the bit end. The winding slot in the release assembly may be cut as a slight spiral to prevent said release assembly from slipping off the cable or wire line.

The inner end portion of the release tube is slanted inwardly and radially outwardly so that a frusto-conical surface 181A is formed which will fit over the inclined surface of the pulling dogs. Hydraulically propelling the overshot release assembly toward the bit end of the drill stem will give it sufficient force such that the aforementioned surface 181A coming in contact with the inclined surfaces of the pulling dogs will overcome the radially outward force of the spring 132 on the dogs and hold the jaws of the pulling dogs in an open or spread position. The radial thickness of the release tube is sufficient to spread the jaws wide enough so that such jaws may be withdrawn over the spear 43. At this time the inner end 181B will abut against the shoulder of the overshot body to retain the pulling dogs in an open position. Now the overshot assembly and the overshot release assembly fitted there around may be retracted.

The structure of the various embodiments of this invention having been set forth, a brief description of the operation thereof will now be made. Assuming that the drill stem 10 is in the hold being drilled, that there is no coupling such as a water swivel 20 on the outermost end of the drill stem, and that it is desired to propel the core barrel inner tube assembly to the bit end of the drill stem where a core sample is to be taken, the following steps are performed. First the core barrel inner tube assembly 30 is inserted into the outer end of the drill stem. Next the water swivel 20 is secured on the outer end of the drill stem and appropriate fluid connections are made so that the pump 25 will force the fluid through line 24 and water swivel 20 into the outer end of the drill stem. Since the enlarged diametric portion 64c substantially forms a fluid seal with the inner periphery of the drill stem, the core barrel inner tube assembly is fluidly propelled towards the bit end of the drill stem as the fluid is pumped into the outer end of the drill stem.

While the core barrel inner tube assembly is fluidly propelled, the peripheral walls of the drill stem hold the dogs 40A, 40B in position illustrated in FIGURE 10. As a result, portion 42D of the plug is retained in position to close a fluid channel between port 53 and slot 64B and thereby prevent the fluid from by-passing the core barrel inner tube assembly. However, once the core barrel inner tube assembly is seated, (see FIGURES 5–8 inclusive), the springs 62 force the latch dogs 40A, 40B to rotate about pivot 55 and extend into the respective recessed 33C. When the latch dogs are seated in the aforementioned recesses, sufficient space is left between the upper ends of the dogs so that the ridge 46 can move inwardly toward the pivot 55 to abut against the dogs to hold said dogs in a latched position, the fluid pressure against the plug 42 forcing said plug to move inwardly once the dogs have been seated to establish the fluid channel 166 (see FIGURE 5) which permits the fluid to by-pass the enlarged diametric portion of the core barrel inner tube assembly and flow through the drill stem.

After the core barrel inner tube assembly has been seated and it is desired to remove said assembly for any reason, for example when the core tube is filled, the water swivel 20 is removed from the outer end of the drill stem and an over-shot assembly, either the embodiment generally designated 125 or the embodiment generally designated 150 may be positioned in the outer end of the drill stem. Assuming that the embodiment of the overshot assembly designated 125 is used, the wire line 122 is inserted through the apertures formed in the drill stem casing head 110 and fastened to the overshot assembly, piston rod 146 as illustrated in FIGURE 12. Now the casing head 110 is threaded on the outer end of the drill stem and the appropriate fluid connections are made between the drill stem and the pump 25 as previously described so that fluid may be forced through line 24 into the casing head and then into the drill stem. The fluid pressure in the outer end of the drill stem forces the piston 148 into engagement with the surface 143A of the tube 143 and thus prevents the fluid from by-passing the overshot assembly.

When the overshot assembly is propelled to contact the core barrel inner tube, the spear point 43 will force the jaws 127 apart so that said jaws will clamp onto the spear point. In the event that the jaws do not clamp onto the spear point, the wire line may be retracted to pull the overshot assemblies a short distance away from the spear in order to utilize the "hammering effect" previously described.

After the jaws have been clamped over the spear point, the wire line is retracted. The initial retraction of the wire line pulls the piston and piston rod outwardly relative to the tube 143 (from the position illustrated in FIGURE 16 to a position illustrated in FIGURE 15) and thus permits the fluid to flow through ports 149 to by-pass the over-shot assembly. Upon further retraction of the wire line, the tube 143 is moved outwardly relative to the lower jaw element 127 as shown in FIGURE 13. Further retraction of the overshot assembly will pull the plug 42 from a position illustrated in FIGURE 5 to a position illustrated in FIGURE 11 where the latch dogs 40A, 40B will be unlatched and thereby permit the core barrel inner tube assembly to be withdrawn upon further retraction of the wire line. In the event that the dogs are not unlatched by the aforementioned procedure, fluid pressure may be again applied to force the overshot assembly towards the bit end to provide a hammering effect such as has been previously described.

If the second embodiment of the overshot assembly, generally designated 150, is used for retracting the core barrel inner tube assembly, said second embodiment is positioned in the drill stem and hydraulically propelled to the core barrel inner tube assembly. As previously described the portion of the overshot assembly 150 adjacent the pivot 130 which includes members 130, 159C, 154, 153 and 159D are of a construction in a cross section to substantially form a fluid seal within the drill stem. Once the jaws 127 of the overshot assembly have been clamped onto the spear point, the wire line 122 may be retracted for withdrawing the core barrel inner tube assembly from the bit end of the drill in the same manner as the overshot assembly 125 was used to withdraw the core barrel inner tube assembly.

An advantage of using the second embodiment of the overshot assembly over that of the first embodiment is that in the event that the core barrel inner tube assembly becomes stuck in the drill stem, the overshot assembly 150 may be disengaged from the core barrel inner tube assembly and separately retracted by utilizing the overshot release assembly 180. Before the drill stem casing head 110 is removed, the valve 27 is closed and valve 26 is opened to drain any fluid out of the drill stem which would tend to flow out of the outer end thereof. Next the coupling from the fluid line 24 is removed so that the drill stem casing head is removed away from said drill stem. Now the overshot release assembly 180 is positioned on the wire line and inserted into the drill stem (see FIGURE 21). Next the drill stem casing head is secured on the drill stem and appropriate fluid connections are made so that fluid may be pumped into the drill stem to force the overshot release assembly to the position illustrated in FIGURE 23. Forcing the overshot release assembly further in an inward direction will position the surface portions 181a against the inclined surfaces 153C, 154C of the latch dogs to force and hold the jaws 127 apart from one another so that the overshot assembly may be disattached from the core barrel inner tube assembly.

After the dog's jaws 127 are disattached from the spear point, the wire line is retracted to pull the overshot assembly in an outward direction. Since the inner edge of the overshot release assembly bears against the shoulder of the overshot body, the overshot release assembly will also be moved in an outward direction as the overshot assembly is withdrawn. When the aforementioned assemblies are adjacent the outer end the casing head may be removed so that said overshot assembly may be withdrawn from the drill stem.

It is to be noted that in using any of the above described core barrel apparatus, prior ot the time the water swivel is to be removed or prior to retracting any core barrel apparatus in the drill stem, the exhaust valve should be opened to permit any fluid which would tend to flow out of the outer end of the drill stem to drain from the drill stem. This is especially important where the drilling direction is horizontal or upward and where the above described wire line core barrel apparatus assemblies 30, 90, 150 or 184 are to be retracted, each of which are constructed to prevent any substantial quantity of fluid by-passing the respective assemblies, that is, other than the core barrel inner tube assemblies in a "latched" condition.

It is apparent that many modifications and variations of the invention as herein before set forth may be made without departing for the spirit and scope thereof, the specific embodiment described or given by way of examples only, and invention limited only by the term of the pending claims.

What I claim is:

1. In core drilling apparatus that includes a drill stem having a hollow bit end located in a hole drilled in the earth, a core barrel inner tube assembly comprising tubular means for collecting a core sample, a latch body connected to said core sample means to extend in an axial direction relative to said tubular means, said latch body having an end portion of reduced transverse cross sectional area, a latch mounted on said end portion for movement between a latched position transversely outwardly from said end portion and a retracted position, a sleeve mounted on said end portion for limited axial movement relative thereto, said sleeve having a slot for the latch to extend through, an enlarged diametric portion of a diameter to form a close fit with the inner peripheral wall of the drill stem and a port on the opposite side of the enlarged diametric portion from said slot, and spear point means slidably mounted in said sleeve for alternately blocking the fluid channel extending through said port into the sleeve, thence through the sleeve and then outwardly through said slot and holding said latch in said latch position, said spear point means moving inwardly to hold said latch in a latched position and thereby opening said fluid channel.

2. For rotary core drilling apparatus that incluudes a drill stem extending into a hole drilled in the earth, a core barrel inner tube assembly comprising tubular means for collecting a core sample, a latch body connected to said core sample means to extend in an axial direction relative to said tubular means, a latch mounted on said latch body for movement between a retracted position and a position extending transversely outward from said latch body, means mounted on the opposite end of said latch body from said tubular means for alternately substantially preventing fluid from passing through said drill stem to by-pass the latch body and forming an open fluid channel to permit fluid to by-pass said latch body, said means on the opposite end of said latch body having a fluid channel formed therein and a valve member held in position to close said fluid channel by said latch in a retracted position moving to a position opening said channel upon said latch moving to a latched position.

3. In core drilling apparatus that includes a drill stem having a bit end and a core barrel inner tube assembly positioned in the drill stem adjacent the bit end, said core barrel assembly having a grapple engageable member, a grapple tool for retracting said assembly, said tool comprising a grapple body having an outer end portion of reduced diameter and means including pulling dogs mounted on said body for clampingly attaching to said member, said pulling dogs extending adjacent said reduced diameter portion, a wire line attached to said tool, and an overshot release assembly for disattaching said pulling dogs from clamping engagement with said member, said overshot release assembly having a transverse section that forms a close fit with the inner peripheral wall of the drill stem, said section having an opening for extending the wire line therethrough.

4. The apparatus of claim 3 further characterized in that the overshot release assembly has an elongated portion that fits between the reduced diameter portion of the grapple body and the drill stem for engaging the pulling dogs for disconnecting them from the core barrel inner tube assembly.

5. In core drilling apparatus for drilling a core from a hole extending from the earth's surface in other than a downward direction into the earth, a hollow drill stem extending from said earth surface into said hole drilled into the earth, a rotary core bit having an opening mounted at one end of said drill stem, fluid pressure means at the surface including a pressure line connected to the opposite end of the drill stem for forcing fluid through the stem to the bit opening, a core barrel inner tube assembly hydraulically propellable through said stem, complementary shoulders formed on the assembly and said drill stem for retaining said assembly in proximity to said core bit, said drill stem having a latch seat adjacent the drill stem shoulder, said assembly having an enlarged diametric portion of a diameter that nearly forms a fluid seal with the inner surface of the drill stem including the section of the drill stem adjacent the surface when the assembly is located therein, said assembly having a fluid channel formed therein and extending in an axial direction to bypass fluid through said enlarged portion, combination latch and valving means at least in part mounted in said channel to move between a first position for blocking said fluid channel, and a second position for unblocking said fluid channel and entering into latching engagement with said latch seat, and means mounting said combination latch and valving means for movement between said positions to block said channel while the assembly is being hydraulically propelled towards the bit end of the drill stem and unblocking said channel while holding said assembly within close proximity of core bit, said combination latch and valving means and latch seat being located to hold said assembly within close proximity of the drill stem shoulder when the said assembly is positioned for receiving a core sample, an overshot assembly having an enlarged diametric portion forming a close fit with the adjacent portion of the drill stem for being hydraulically propelled toward the bit end of the drill stem, said overshot assembly having means for coupling onto the core barrel inner tube assembly, said core barrel assembly having means for being coupled to the overshot assembly and wire line means connected to said overshot assembly for retracting said overshot assembly and said core barrel inner tube assembly.

6. The apparatus of claim 5 further characterized in that the overshot means enlarged diametric portion has a fluid channel formed therein to bypass fluid from one axial end of the enlarged diametric portion thereof to the opposite axial end, said overshot means including means mounted for limited movement relative to the overshot means enlarged diametric portion for, in a first limit position blocking said fluid channel when said overshot means is being hydraulically propelled toward the core bit and in a second limit position opening said channel when said overshot means is being retracted and means connecting the overshot fluid channel blocking means to said overshot portion for movement between said positions.

7. The apparatus of claim 5 further characterized in that the overshot means includes an overshot body that in conjunction with the drill stem forms a fluid channel for conducting fluid from one axial end of the overshot body to the opposite end thereof and that the overshot enlarged diametric portion comprises piston means having a fluid channel formed therein and being movably attached to the overshot body for movement between a first position to act in conjunction with the overshot body for blocking said fluid channel upon fluid pressure being exerted against the piston means and a second position opening said fluid channel, said wire line means being attached to the piston means for moving said piston means to open said fluid channel.

8. The apparatus of claim 5 further characterized in that combination latch and valving mounting means includes a latch body and that the combination latch and valving means includes the aforementioned core barrel assembly enlarged diametric portion, said latch body having the last mentioned portion mounted thereon, a latch mounted on the latch body for movement between a position blocking the fluid channel through the said last mentioned portion, and a position into latching engagement with the latch seat and at the same time unblocking said channel.

9. The apparatus of claim 5 further characterized in that overshot release means is provided, said overshot release means being slidable on said wire line means in said hollow drill stem and into engagement with said overshot assembly for uncoupling the overshot assembly from the core barrel inner tube assembly.

10. The apparatus of claim 5 further characterized in that the combination latch and valving means mounting means comprises a latch body and a latch mounting member mounted on said latch body, and that the combination latch and valving means includes a latch mounted on said latch mounting member for movement between a latch seat engaging position and a retracted position out of engagement with said latch seat and valving means mounted for movement relative to said latch body for opening the fluid channel when the latch is seated.

11. The apparatus of claim 10 further characterized in that the valving means has the assembly enlarged diametric portion and the assembly clamp engageable means formed as a part thereof and includes a latch engaging portion mounted for limited movement relative to the clamp engageable means for retracting said latch when the overshot means has clamped onto said assembly clamp engaged means and is retracted.

12. The apparatus of claim 10, further characterized in that the valving means includes a protruding means abutting against said latch, said protruding means preventing the valving means from opening the fluid channel until the latch is seated.

13. In rotary core drilling apparatus, a tubular drill stem having a latch seat adjacent one end thereof, a bit having an axial opening at said one end of the drill stem, an axially elongated retractable core barrel inner tube assembly that is hydraulically propellable in said drill stem to a position adjacent said bit, complementary retaining means on said assembly and within said drill stem for holding said assembly proximate the bit, said assembly in conjunction with the drill stem being constructed to form a fluid channel extending from one axial end of the assembly to the opposite end of said assembly, said assembly including means for receivably retaining a core sample, an enlarged diametric portion axially spaced from said assembly retaining means and of a diameter that forms a close fit with the inner peripheral walls of the drill stem so as substantially to block fluid flow through the drill stem at said portion, said portion having a part of the fluid channel extending axially therethrough and being connected to the core receiving means and combination latch and valving means movably connected to said enlarged diametric portion for alternately blocking the fluid channel through the enlarged diametric portion when the assembly is being hydraulically propelled, and unblocking said last mentioned channel and latchingly engaging said latch seat when the assembly is adjacent the bit.

14. Rotary drill apparatus for taking a core sample comprising a tubular drill stem having an outer end, a core bit having a central axial aperture mounted on the other end of said drill stem, a retractable core barrel inner tube assembly for being hydraulically propelled from the outer end of said drill stem to the bit end thereof, said drill stem and said assembly having complementary shoulder means for holding the end of said core barrel assembly proximate said bit, said drill stem having a latch seat formed therein adjacent said other end, said assembly having means for holding a core sample, channel means for bypassing drilling fluid around said shoulder means, latch means connected to said channel means for holding said assembly adjacent the drill stem shoulder means, second means connected to the assembly shoulder means for forming a second fluid channel, said second fluid channel means having an outlet opening axially outwardly from the shoulder means and having an outer diametric section that nearly forms a fluid seal with the inner surface of the drill stem, and valving means movably mounted on the second fluid channel means for closing the second fluid channel until latch means is seated, and thereupon unblocking said second fluid channel.

15. The apparatus of claim 14 further characterized in that the second fluid channel means includes means for releasing said latch means.

16. Rotary core drilling apparatus for taking a core sample from a hole extending either in a downward direction or other than a downward direction, a tubular drill stem, a core bit having a central axial aperture mounted on one end of the drill stem, said drill stem having a latch seat adjacent the core bit, a retractable core barrel assembly positionable within said drill stem adjacent the said bit, said assembly including a fitting, a core barrel connected to said fitting, latch means connected to the fitting and mounted for movement between a latching position in latching engagement with the latch seat for holding said core barrel adjacent the core bit and a nonlatching position, means mounted for limited movement relative to fitting for unlatching said latch means, said unlatching means forming substantially a fluid seal with the drill stem and having a fluid channel therethrough, valving means movably mounted on said unlatching means for blocking said fluid channel until the latch means is in a latched position, said valving means having an overshot clamp engageable portion, overshot means for withdrawing said assembly from the drill stem, said overshot means including grapple means for coupling to said core barrel assembly portion, and wire line means for withdrawing said overshot means from said drill stem.

17. Rotary core drilling apparatus for taking a core sample from a hole extending either in a downward direction or other than a downward direction, a tubular drill stem, a bore bit having a central axial aperture mounted on one end of the drill stem, said drill stem having a latch seat adjacent the core bit, a retractable core barrel assembly positionable within said drill stem adjacent the said bit, said assembly including a fitting, a core barrel connected to said fitting, latch means connected to the fitting and mounted for movement between a latching position in latching engagement with the latch seat for holding said core barrel adjacent the core bit and a nonlatching position, means mounted for limited movement relative to fitting for unlatching said latch means, said unlatching means forming substantially a fluid seal with the drill stem and having a fluid channel therethrough, valving means movably mounted on said unlatching means for blocking said second fluid channel until the latch means is at a latched position, said assembly having an overshot clamp engageable portion, overshot means for withdrawing said assembly from the drill stem, said overshot means including grapple means for clampingly engaging said member and an outer portion of reduced diameter, said grapple means in part having a portion adjacent said outer portion, wire line means connected to the overshot means for withdrawing said overshot means from said drill stem, and overshot release means for releasing said overshot assembly from clamping engagement with said member, said overshot release means having a tubular portion of dimensions to extend over said reduced diameter of the overshot means and into engagement with the grapple means.

18. In rotary core drilling apparatus for retracting a core barrel inner tube assembly located in a drill stem inwardly from the surface, said assembly having a grapple attaching surface portion comprising a grapple tool for retracting the core barrel inner tube assembly, said tool including means for forming a close fit with the inner peripheral walls of the drill stem through a transverse section of the drill stem so that said tool may be hydraulically propelled through the drill stem, the aforementioned means including a latch body of a construction to permit fluid in the drill stem to bypass said body, valving means connected to said latch body for movement between a first position substantially restricting the flow of fluid bypassing the latch body when the tool is positioned in the drill stem to be hydraulically propelled through said stem and a second position to more freely permit fluid to bypass said latch body and means connected to said latch body for clampingly engaging said grapple attaching surface portion, and wire line means for retracting said tool, said wire line means being connected to the valving means for moving said valving means from the first position to the second position.

19. The apparatus of claim 18 further characterized in that the valving means includes a piston connected to the latch body, said piston being mounted to substantially prevent fluid by-passing the tool when fluid is pumped into said drill stem to exert pressure against an outer surface of the piston.

20. A rotary core drilling apparatus for retracting a core barrel inner tube assembly located in the drill stem inwardly from the surface, said assembly having a grapple engageable member, comprising a grapple tool for retracting the core barrel assembly, said tool including means for forming a close fit with the inner peripheral walls of the drill stem through the transverse section of the drill stem so that said tube may be hydraulically propelled through said drill stem, said means including a grapple body and grapple means mounted on said body for clamping onto the assembly grapple member, said grapple means including a pair of pulling dogs having interfitting hub portions and a pivot extended through said hub portions for pivotally mounting said dogs on the grapple body, said grapple tool being constructed to have said grapple body, hub portions and drill stem in the area of the pivot forming a close fluid fit through the transverse section thereof to substantially block flow of fluid through said section in the drill stem, and wire line means connected to the grapple tool for retracting said grapple tool in the drill stem.

21. A rotary core drilling apparatus that includes a drill stem having a bit end and a core barrel inner tube assembly positioned in the drill stem adjacent the bit end, said assembly having a grapple engageable member, comprising a grapple tool having a grapple body, first means mounted on the grapple body for clampingly attaching to said member, said grapple body and clamp means in conjunction in transverse cross-section forming a close fluid fit with the inner peripheral wall of the drill stem for permitting the grapple tool being hydraulically propelled to the bit end of the drill stem in both downwardly and upwardly drilling directions, second means connected to the grapple body for applying a hammering blow to said grapple body, and wire line means connected to the second means for retracting said tool in the drill stem.

22. In rotary core drilling apparatus that includes a drill stem having a bit end, and a core barrel inner tube assembly positionable adjacent the bit end, said core barrel inner tube assembly having a grapple engageable member, a grapple tool comprising a grapple body, first means mounted on the grapple body for clampingly engaging said grapple engageable member, second means connected to the grapple body for applying a hammering blow to the grapple body, third means connected to the second means for limited movement relative to the second means to act in conjunction with the second means for alternately forming a fluid seal with the inner peripheral wall of the drill stem to prevent fluid bypassing said tool in the drill stem, and providing a fluid channel to permit the fluid bypassing said tool in the drill stem, said first, second and third means and grapple body being constructed to provide in conjunction with adjacent portions of the drill stem a fluid channel from the axial end of the tool to the opposite end thereof, and wire line means connected to the fluid channel blocking means for retracting said third means and thereby retract the tool in the drill stem.

23. Rotary core drilling apparatus for taking a core sample comprising a drill stem, a bit having a central axial aperture mounted on one end of said drill stem, said drill stem having a seat adjacent said bit, a core barrel assembly having tubular means for receiving the core sample as the sample is drilled, said tubular means having an outer diameter larger than the diameter of said axial aperture, and means movably connected to the core receiving means, said means having an enlarged diametric portion which substantially blocks fluid flow through the drill stem at said portion, a fluid channel through said portion, means for alternately restricting the flow of fluid in said channel bypassing said diametric portion in the drill stem to permit the assembly being fluidly propelled through the drill stem and opening fluid channel to permit the fluid to more freely bypass said assembly and at the same time engaging said seat to retain the assembly adjacent the bit, said last mentioned means including a grapple tool engageable member to permit the assembly being retracted in the drill stem.

24. In wire line core drilling apparatus having a drill stem adapted to extend inwardly into an earth formation, a core barrel inner tube assembly adapted to be removably positioned in the inner end of said drill stem, a grapple tool, and wire line means including a wire line for retracting said grapple tool in said drill stem, said assembly having a member for the grapple tool to be releasably attached to, said grapple tool having grapple element for releasably attaching to said member, the improvement comprising an overshot release assembly having a portion to form a close fit within the peripheral surface of said drill stem, said portion having a central aperture through which the wire line means may be extended, and release means extending inwardly from said portion for engaging said grapple element for disattaching said grapple element from the core barrel inner tube assembly.

25. The apparatus of claim 24 further characterized in that said overshot release assembly has a slot through which the wire line may be inserted to facilitate slidably mounting the overshot release assembly on the wire line means with the wire line means extending through said central aperture.

26. In core drilling apparatus for drilling a core from a hole extending from the earth surface in other than a downward direction into the earth, a hollow drill stem extending from said earth surface into said hole drilled into the earth, a rotary core bit having an opening mounted at one end of the drill stem, fluid pressure means at the surface including a pressure line connected to the opposite end of the drill stem for forcing fluid through the stem to the bit opening, a core barrel inner tube assembly hydraulically propellable through said stem, complementary shoulders formed on the assembly and said drill stem for retaining said assembly proximate to said core bit, said drill stem having a latch seat adjacent the drill stem shoulder, said assembly having an enlarged diametric portion of a diameter that nearly forms a fluid seal with the inner surface of the drill stem including the section of the drill stem adjacent the surface when the assembly is located therein, said assembly having a fluid channel formed therein and extending in an axial direction to by-pass the fluid through said enlarged portion, combination latch and valving means at least in part mounted in said channel to move between a first position for blocking said fluid channel and a second position for unblocking said fluid channel and entering into latching engagement with said latch seat, means mounting said combination latch and valving means for movement between said positions to block said channel while the assembly is being hydraulically propelled toward the bit end of the drill stem and unblocking said channel while holding said assembly within close proximity of the core bit, said combination latch and valving means and latch seat being located to hold said assembly within close proximity of the drill stem shoulder when said assembly is positioned for receiving a core sample, an overshot assembly, said core barrel assembly having coupling means for being coupled to said overshot assembly, said overshot assembly having an enlarged diametric portion forming a close fit with the adjacent portion of the drill stem for being hydraulically propelled toward the bit end of the drill stem, an overshot releasable coupling means for releasably coupling it to the coupling means of the core barrel assembly, and an end portion shaped to provide a clearance space extending to said releasable coupling means, wire line means connected to said overshot assembly for retracting said overshot assembly and said core barrel inner tube assembly, and overshot release means slidably mountable on the wire line means, said overshot release means extendable into said space for disattaching said overshot releasable coupling means from coupling engagement with the core barrel inner tube assembly coupling means.

27. Core drilling apparatus for taking a core sample from the bit end of the drill stem while said bit drills a hole in the earth, said drill stem having a latch seat adjacent the bit end, comprising a retractable core barrel assembly seatable adjacent the bit for receiving the core, said assembly and drill stem cooperatively forming a fluid channel for conducting fluid to bypass the assembly in the drill stem, said assembly having a diametric portion of an outer diameter to form a close fit with the major portions of the drill stem, said diametric portion having a portion of the fluid channel extending therethrough, said assembly including a fitting, first means mounted on said fitting for receiving the core sample, and second means movably mounted on the fitting to move alternately to a first position for restricting the flow of fluid through said diametric portion fluid channel portion and bypassing the assembly in the drill stem to permit the assembly being fluidly propelled and to a second position to allow the fluid to move more freely through said channel portion and bypass said assembly, said second means including a latch movably mounted on the fitting for movement into the latch seat and alternately to a retractable position and a latch retracting member mounted on the fitting for limited movement to permit the latch being moved to a latched position and alternately retracting said latch, said latch retracting member having the diametric portion forming a portion thereof, and valve means movably mounted on the latch retracting member in engagement with the latch for blocking said fluid channel portion when the latch is retracted and opening said fluid channel portion when the latch is in a latched condition.

28. In core drilling apparatus for taking a core sample comprising a drill stem and a core bit mounted on one end of said drill stem, said drill stem having a latch seat adjacent the core bit, a retractable core barrel assembly seatable adjacent the bit for receiving the core, said assembly and drill stem cooperatively forming a fluid channel for conducting fluid to bypass the assembly and the drill stem, said assembly having a diametric portion of an outer diameter to form a close fit with the major portion of the drill stem, said diametric portion having a portion of the fluid channel extending therethrough, said assembly including a fitting, first means mounted on the said fitting for receiving a core sample, and second means movably mounted on the fitting to move alternately to a first position for restricting the flow of fluid through said diametric portion fluid channel portion and bypassing the assembly of the drill stem to permit the assembly being hydraulically propelled, and to a second position to allow fluid to move more freely through said channel portion and bypass said assembly, said second means including a latch movably mounted on the fitting for movement into the latch seat and to a retracted position and a latch retracting member mounted on the fitting for limited movement to permit the latch being moved to a latched position, and alternately retracting said latch, said latch retracting member having the diametric portion forming a portion thereof, said latch in the retracted position being located in the fluid channel to block said channel and in a latched condition opening said channel.

29. In core drilling apparatus for taking a core sample from a hole extending from the earths surface, a drill stem, a core bit mounted on the inner end of said drill stem, a hydraulic pump mounted at the surface, a fluid line connecting said hydraulic pump to said drill stem such that the hydraulic pump may force the drilling fluid through said drill stem, a retractable core barrel inner tube assembly seatable in the drill stem adjacent the core bit, said assembly having a diametric portion that forms a close fit with the inner periphery of the drill stem, said diametric portion having a fluid channel extending therethrough, and valving means movably mounted adjacent said diametric portion for in a first position blocking said channel until the assembly is seated adjacent the core bit and thence automatically movable to a second position to open said channel when the core barrel inner tube assembly has seated, said core barrel inner tube assembly having inter-engaging grapple surface portion adapted to be engaged, a grapple assembly for engaging said core barrel inner tube assembly surface portion, said grapple assembly including grapple means for clampingly engaging said core barrel inner tube assembly surface portion and a diametric portion having an outer diameter that is of a dimension to form a close fit with the inner peripheral wall of said drill stem so that the grapple assembly may be hydraulically propelled to the core barrel inner tube assembly adjacent the core bit, said grapple means being connected to said grapple assembly diametric portion, and wire line means for retracting said grapple assembly.

30. The apparatus of claim 29 further characterized in that said interengaging surface portion is integrally formed with the valving means and has a portion engaged by said grapple means, said valving means being mounted for movement to a position to block said fluid channel when the grapple assembly engages said portion and exerts a pulling force thereon.

References Cited in the file of this patent

UNITED STATES PATENTS

| | | |
|---|---|---|
| 1,499,024 | Miller | June 24, 1924 |
| 1,721,234 | Russell | July 16, 1929 |
| 2,145,170 | Frenzel | Jan. 24, 1939 |
| 2,251,679 | Kinnear | Aug. 5, 1941 |
| 2,260,320 | Hoffoss | Oct. 28, 1941 |
| 2,277,989 | Kinnear | Mar. 31, 1942 |
| 2,294,521 | Steadman et al. | Sept. 1, 1942 |
| 2,296,397 | Mulbach | Sept. 22, 1942 |
| 2,344,067 | Walker | Mar. 14, 1944 |
| 2,810,547 | Fehlmann | Oct. 22, 1957 |
| 2,829,868 | Pickard et al. | Apr. 8, 1958 |
| 2,857,138 | Svendsen et al. | Oct. 21, 1958 |